United States Patent
James et al.

(10) Patent No.: US 6,625,569 B2
(45) Date of Patent: Sep. 23, 2003

(54) REAL-TIME SPATIO-TEMPORAL COHERENCE ESTIMATION FOR AUTONOMOUS MODE IDENTIFICATION AND INVARIANCE TRACKING

(75) Inventors: Mark L. James, Pasadena, CA (US); Ryan M. E. Mackey, Pasadena, CA (US); Han G. Park, Arcadia, CA (US); Michail Zak, Cypress, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 10/092,471

(22) Filed: Mar. 6, 2002

(65) Prior Publication Data

US 2003/0018928 A1 Jan. 23, 2003

Related U.S. Application Data

(60) Provisional application No. 60/274,536, filed on Mar. 8, 2001.

(51) Int. Cl.$^7$ .............................................. G06F 17/00
(52) U.S. Cl. ..................... 702/183; 702/84; 702/104; 702/190; 702/191; 702/196
(58) Field of Search ........................ 702/84, 104, 183, 702/190, 191, 196; 700/29, 33, 44, 38; 708/300; 703/2, 7; 706/14, 24, 33, 52; 714/25

(56) References Cited

U.S. PATENT DOCUMENTS

| | | |
|---|---|---|
| 5,060,132 A | 10/1991 | Beller et al. |
| 5,099,436 A | 3/1992 | McCown et al. |
| 5,210,704 A | 5/1993 | Husseiny |
| 5,309,448 A | 5/1994 | Bouloutas et al. |
| 5,408,412 A | 4/1995 | Hogg et al. |
| 5,442,555 A | 8/1995 | Reifman et al. |
| 5,465,321 A | 11/1995 | Smyth |
| 5,555,444 A | 9/1996 | Diekelman et al. |

(List continued on next page.)

OTHER PUBLICATIONS

John R. Taylor, An Introduction to Error Analysis, The Study of Uncertainties in Physical Measurements, University of Science Books, Oxford University Press, title page and three pages of contents.

John Hertz et al., Introduction to The Theory of Neural Computation, Santa Fe Institute Studies in the Sciences of Complexity, Lecture Notes vol. I, title page and three pages of contents, Addison–Wesley Publishing Company.

Jie Chen et al., Robust Model–Based Fault Diagnosis for Dynamic Systems, 1999, title page and 6 pages of contents, Kluwer Academic Publishers, Boston/Dordrecht/London.

George E. P. Fox, et al., Times Series Analysis, Forecasting and Control, title page and 11 pages of contents, Third Edition, Prentice Hall, Englewood Cliffs, New Jersey 07632.

Brotherton and Mackey, "Anomaly Detector Fusion for Advanced Military Aircraft," The 2001 IEEE Aerospace Conference, Big Sky, Montana, Mar. 2001.

Colgren et al."Technologies for Reliable Autonomous Control (TRAC)," IASTED '99 Control and Applications Conference, Banff, Canada, Jul. 1999.

(List continued on next page.)

*Primary Examiner*—Marc S. Hoff
*Assistant Examiner*—Carol S Tsai
(74) *Attorney, Agent, or Firm*—Townsend and Townsend and Crew LLP

(57) ABSTRACT

A general method of anomaly detection from time-correlated sensor data is disclosed. Multiple time-correlated signals are received. Their cross-signal behavior is compared against a fixed library of invariants. The library is constructed during a training process, which is itself data-driven using the same time-correlated signals. The method is applicable to a broad class of problems and is designed to respond to any departure from normal operation, including faults or events that lie outside the training envelope.

16 Claims, 13 Drawing Sheets

U.S. PATENT DOCUMENTS

| | | | |
|---|---|---|---|
| 5,586,066 | A | 12/1996 | White et al. |
| 5,590,395 | A | 12/1996 | Diekelman |
| 5,661,668 | A | 8/1997 | Yemini et al. |
| 5,740,033 | A | 4/1998 | Wassick et al. |
| 5,761,090 | A | 6/1998 | Gross et al. |
| 5,799,154 | A | 8/1998 | Kuriyan |
| 5,805,447 | A * | 9/1998 | Teng et al. ............ 700/28 |
| 5,819,226 | A | 10/1998 | Gopinathan et al. |
| 5,864,773 | A * | 1/1999 | Barna et al. ............ 702/182 |
| 5,950,147 | A | 9/1999 | Saragapani et al. |
| 5,987,399 | A | 11/1999 | Wegerich et al. |
| 5,991,525 | A | 11/1999 | Shah et al. |
| 6,012,152 | A | 1/2000 | Douick et al. |
| 6,202,033 | B1 * | 3/2001 | Lange ............ 702/104 |
| 6,249,755 | B1 * | 6/2001 | Yemini et al. ............ 702/181 |
| 6,285,971 | B1 * | 9/2001 | Shah et al. ............ 700/38 |
| 6,310,626 | B1 * | 10/2001 | Walker et al. ............ 345/589 |
| 6,321,338 | B1 | 11/2001 | Porras et al. |
| 6,331,835 | B1 * | 12/2001 | Gustafson et al. ..... 342/357.01 |
| 6,415,276 | B1 * | 7/2002 | Heger et al. ............ 702/183 |
| 2002/0040278 | A1 * | 4/2002 | Anuzis et al. ............ 702/56 |

OTHER PUBLICATIONS

Fukunaga et al. "Toward an Application Framework for Automated Planning and Scheduling," Proceedings of the International Symposium on Artificial Intelligence, Robotics, and Automation for Space, Tokyo, Japan, Jul. 1997.

James and Atkinson "Software for Development of Expert Systems," NASA Tech Briefs, vol. 14, No. 6, Jun. 1990.

James and Dubon "An Autonomous Diagnostic and Prognostic Monitoring System for NASA's Deep Space Network", The 2001 IEEE Aerospace Conference, Big Sky, Montana, Mar. 2001.

Meyer et al. "The Application of Neural Networks to the SSME Startup Transient,"AIAA paper 91–2530 27th Joint Propulsion Conference (1991).

Schaefer et al., "Technologies for Reliable Autonomous Control (TRAC) of UAVs," The 2001 IEEE Aerospace Conference, Big Sky, Montana, Mar. 2001.

Taken "Detection Strange Attractors on Turbulence" and "Dynamical Systems and Turbulence," *Lecture Notes in Mathematics* vol. 898 (Warwick 1980), Springer–Verlag.

Wheeler et al. "SSME Sensor Modeling Using Radial Basis Function Neural Networks," J. of Spacecraft and Rockets 31:1054–1060 (1994).

ZAK "Physical Models of Cognition," Int. J. of Theoretical Physics 33:1113–1161 (1994).

ZAK "Postinstability Models in Dynamics," Int. J. of Theoretical Physics 33:2215–2281 (1994).

* cited by examiner

REAL-TIME SPATIO-TEMPORAL COHERENCE ESTIMATION FOR AUTONOMOUS MODE IDENTIFICATION AND INVARIANCE TRACKING

CROSS REFERENCE TO RELATED APPLICATIONS

The present application claims priority from the following U.S. Provisional application: U.S. Application No. 60/274, 536, filed Mar. 8, 2001 and titled "Exception Analysis for Multimissions" which is incorporated herein by reference for all purposes. The present invention is related to concurrently filed and commonly owned U.S. Non-provisional application Ser. No. 10/092,491 entitled "Exception Analysis for Multimissions" and is herein incorporated by reference for all purposes.

STATEMENT AS TO RIGHTS TO INVENTIONS MADE UNDER FEDERALLY SPONSORED RESEARCH OR DEVELOPMENT

The U.S. Government has certain rights in this invention pursuant to Grant Nos. NPO 21025, NPO 20803, NPO 20829, NPO 20827 and NPO 21126 awarded by NASA.

BACKGROUND OF THE INVENTION

The invention relates generally to system health assessment, and more specifically to diagnosis and prognosis of system performance, errant system conditions, and abnormal system behavior in an instrumented system.

Complex systems typically cannot tolerate a long down time and so need to be constantly monitored. For example, a semiconductor fabrication facility cannot afford to be offline for an extended period of time. In addition to the loss of wafer production, it takes considerable time to restart the line. A patient monitoring station must have high reliability in order to be useful. Spacecraft must be constantly monitored in order to detect faults and to detect trends in system operation which may lead to faults, so that proactive corrective action can be taken.

It is also important to avoid false positive indications of a system error. It is both costly and time consuming to bring a system down, replace or repair the supposed error, and bring the system back up only to discover that the incorrect remedy was taken.

As advances in technology permit higher degrees of integration both at the component level and at the system level, systems become increasingly more complex. Consequently, improvements for determining system performance and assessing system health are needed, to adequately detect system faults and operational trends that might lead to system failure.

BRIEF SUMMARY OF THE INVENTION

A method and apparatus for diagnosis and prognosis of faults in accordance with embodiments of the invention is based on sensor data and discrete data. In an embodiment of the invention, anomaly detection is made based on a statistical analysis of time-correlated sensor data and on mode of operation of the system as determined by the discrete data. In another embodiment of the invention, anomaly detection is further based on a statistical analysis of individual sensor data.

BRIEF DESCRIPTION OF THE DRAWINGS

The teachings of the present invention can be readily understood by considering the following detailed description in conjunction with the accompanying drawings.

DESCRIPTION OF THE SPECIFIC EMBODIMENTS

1.0 Introduction

Figure 1A:
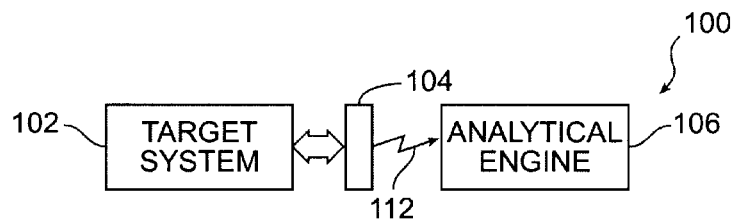
FIG. 1A illustrates the present invention in the context of its general operating environment.

BEAM stands for Beacon-based Exception Analysis for Multimissions, an end-to-end method of data analysis intended for real-time fault detection and characterization. Its intent was to provide a generic system analysis capability for potential application to deep space probes and other highly automated systems. Such systems are typified by complex and often unique architectures, high volumes of data collection, limited bandwidth, and a critical need for flexible and timely decision abilities.

Two important features make BEAM standout among the various fault-protection technologies that have been advanced. The first is its broad range of applicability. This approach has been used with sensor and computed data of radically different types, on numerous systems, without detailed system knowledge or a priori training. Separate components are included to treat time-varying signals and discrete data, and to interpret the combination of results.

The second is its ability to detect, and with few exceptions correctly resolve, faults for which the detector has not been trained. This flexibility is of prime importance in systems with low temporal margins and those with complex environmental interaction. This ability also comes with few requirements in terms of detector training.

We will begin with the motivation and general problem statement. Following this, we will examine the overall architecture at a block level. We will then examine the individual component technologies in depth, including the governing equations and such issues as training, interface, and range of applicability.

2.0 History

BEAM was initially proposed to investigate a new system health analysis method. The purpose of BEAM was to fill a critical role in supporting the new Beacon method of operations. Beacon operation can be described as a condition-specific mode of communication between a remote system and ground personnel, where lengthy transmissions are sent to the operators only where unexpected spacecraft behavior warrants the expense. Instead of the current method, where large amounts of data are downlinked on a regular basis, the Beacon paradigm uses two transmitters—one high-gain transmitter as before and a new very low-gain transmitter, the "beacon." The beacon transmits one of four tones at all times, indicating whether or not the spacecraft needs to dump engineering data. A first "tone" would be sent during normal operation to signify that all is well. If there are significant faults detected, then other tones are transmitted to indicate that data explaining the problem needs to be retrieved.

Such a paradigm is highly desirable if downlink capacity is limited. Although the number of NASA missions is increasing dramatically, along with their complexity, the amount of available communications antenna resources remains fairly constant. The Beacon paradigm more efficiently shares such limited resources.

Beacon operation requires several ingredients, and is therefore only practicable if a number of hurdles can be overcome. Central to the method is the ability of a spacecraft to perform an accurate, timely, and verifiable self-diagnosis. Such a self-diagnosis must not only provide a safe operating envelope, but must perform comparably at worst to the system experts in the control room. A system that is insensitive, generates false alarms, or requires oversight will not be effective, because such inefficiencies will be amplified in a "streamlined" process.

The basic premise of BEAM was the following: Construct a generic strategy to characterize a system from all available observations, and then train this characterization with respect to normal phases of operation. In this regard the BEAM engine functions much as a human operator does— through experience and other available resources (known architecture, models, etc.) an allowed set of behavior is "learned" and deviations from this are noted and examined. Such an approach should be applied as a complement to simplistic but reliable monitors and alarms found in nearly all instrumented systems. The approach should also be constructed such that information products can be used to drive autonomic decisions, or to support the decisions of human operators. In other words, the system must allow for intervention and aid it wherever possible. If this is not done, it is difficult for spacecraft experts to gain trust in the system and the benefits of beacon operation or any similar cost-saving approach will be doomed from the outset.

Philosophically, the BEAM approach is similar to that of two familiar advanced techniques, namely Neural Networks and Expert Systems. Each of these has its particular strengths and weaknesses:

1. Neural networks are effective means of sensor fusion and separation between classes of data. However, they are difficult to adapt to cases where unknown classes exist. Furthermore, identifying the source of fault indicated by a neural network is not usually possible (low traceability).
2. Expert Systems are effective and adaptable means of applying logical rules and decisions, but are only as good as the rules that are available to them. Such systems also perform badly in the face of unknown fault classes and are expensive to train.

On the other hand, each of these approaches does have powerful benefits as well, and we will see how they have been blended with our novel techniques to take full advantage of available technology.

Aspects of the invention as described by the illustrated example of the disclosed architectural description include:

1. direct insertion of physical models (gray box);
2. integration of symbolic reasoning components;
3. statistical and stochastic modeling of individual signals;
4. trending to failure for individual signals and cross-signal features; and
5. expert system as enumerator of results.

BEAM is a specific system embodying all the aspects of the invention as disclosed herein. It represents the inventors' best mode for practicing the invention at the time of the invention. The "beacon" aspect of the BEAM system is simply the communication front-end which relies on a paradigm suitable for systems where communication bandwidth is limited. It will be appreciated that the various embodiments of the present invention constitute the core components of the BEAM architecture, which do not rely on beacon-based communications. However, reference to BEAM will be made throughout the discussion which follows, for the simple reason that the BEAM architecture contains the various embodiments of the present invention.

One of ordinary skill in the art will readily appreciate that any system can be adapted with aspects of the present invention to realize the benefits and advantages of fault detection and assessment in accordance with embodiments of the invention. Systems where teams of experts who review the engineering data on a regular basis and who typically oversee the analysis process are well suited for a fault detection and characterization system according to teachings of the invention. Complex machinery that rely upon internal sensing and expert operators to provide operating margins for reasons of safety or efficiency can benefit from the invention. System maintenance can be greatly simplified by incorporating various aspects of the invention into a maintenance system. The invention is particularly well suited to systems that are fully automated and require advanced fault detection and isolation techniques.

The generalized block diagram shown in FIG. 1A illustrates the general applicability of the present invention in a system. A monitored system 100 includes a target system 102 for which its operational health is to be monitored. The target system 102 has associated with it various sources 104 of operational data relating to its operation. This includes information such as data from physical sensors (e.g., transducers), data produced by software running on the target system, switch settings, and so on.

The operational data is conveyed over a channel 112 to a data analysis engine 106. The data analysis engine comprises a computing system for processing the information in accordance with various embodiments of the invention. The computing system can be any known computing environment, comprising any of a number of computer architectures and configurations.

Figure 1B:
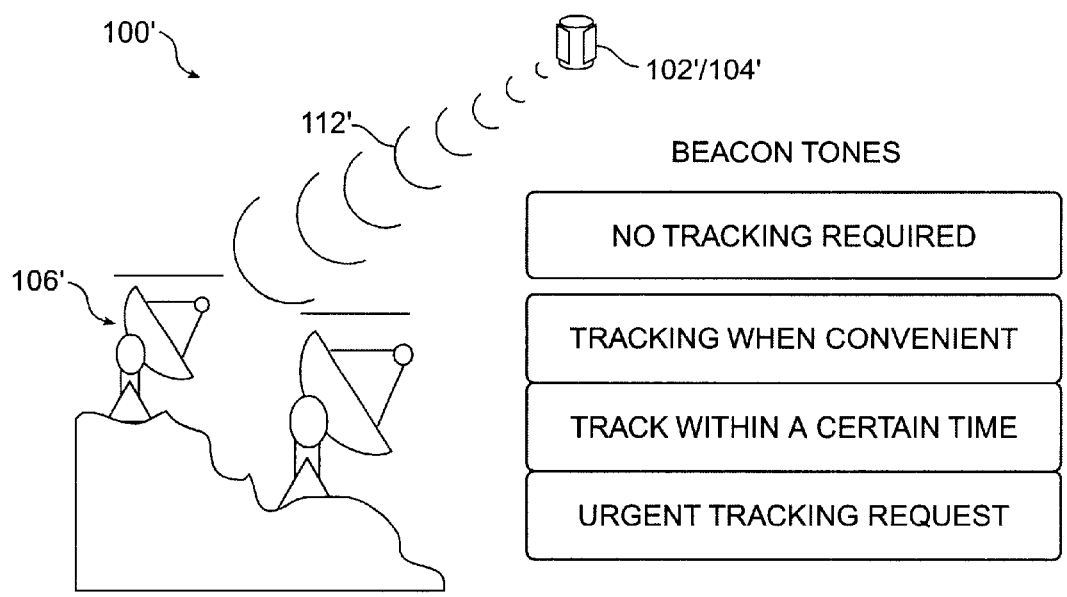
FIG. 1B shows a typical application of the invention.

FIG. 1B illustrates and example of a complex system which incorporates the present invention. A satellite device 102' includes data sources 104' which produce operational data. Generally, the data is communicated by a downlink signal 112' to ground stations 106', where the information is subjected to the analytical techniques of the present invention. In practice, some aspects of the present invention can be embodied in the satellite device itself in addition to the ground station computers. The downlink signal comprises a beacon component and a data stream component. The beacon component is in effect during most of the time, transmitting an appropriate beacon tone. However, when a problem arises, the downlink signal begins transmitting appropriate data to the ground stations computers.

3.0 Overall Architecture

At the simplest level of abstraction, BEAM is software which takes sensor data and other operational data as input and reports fault status as output. Implementation of this software is dependent on the application, but a typical application would have a system with a number of individual components, each of which reports health or performance data to a local computer, whereupon a local BEAM manager draws a conclusion during runtime and forwards the results to a decision maker. We must consider the physical makeup of the device in question when deciding how to compartmentalize the diagnosis. Consideration must be made for computing power, communication and data buses, and the natural divisions present in the system. To accommodate such a wide range of possibilities, the computational engine of BEAM itself is highly adaptable with respect to subsystem size and complexity.

For each single compartment or subsystem, we can expect to receive four types of data:

1. Discrete status variables changing in time—mode settings, switch positions, health bits, etc.
2. Real-valued sensor data varying at fixed rates—performance sensors or dedicated diagnostic sensors. The sensor data, in the context of the present invention, includes any data relating to the physical condition of the machine. For example, sensor data may include data from force transducers, chemical sensors, thermal sensors, accelerometers, rotational sensors, and so on.
3. Command information—typically discrete as in 1.
4. Fixed parameters—varying only when commanded to change but containing important state information.

These types of data are all of value but in different ways. Status variables and commands are useful to a symbolic model. Commands and fixed parameters are useful to a physical system model. Time-varying sensor data is useful for signal processing approaches. In order to study each and combine results, the following architecture in accordance with the invention is set forth as presented in FIG. 2.

Figure 2:
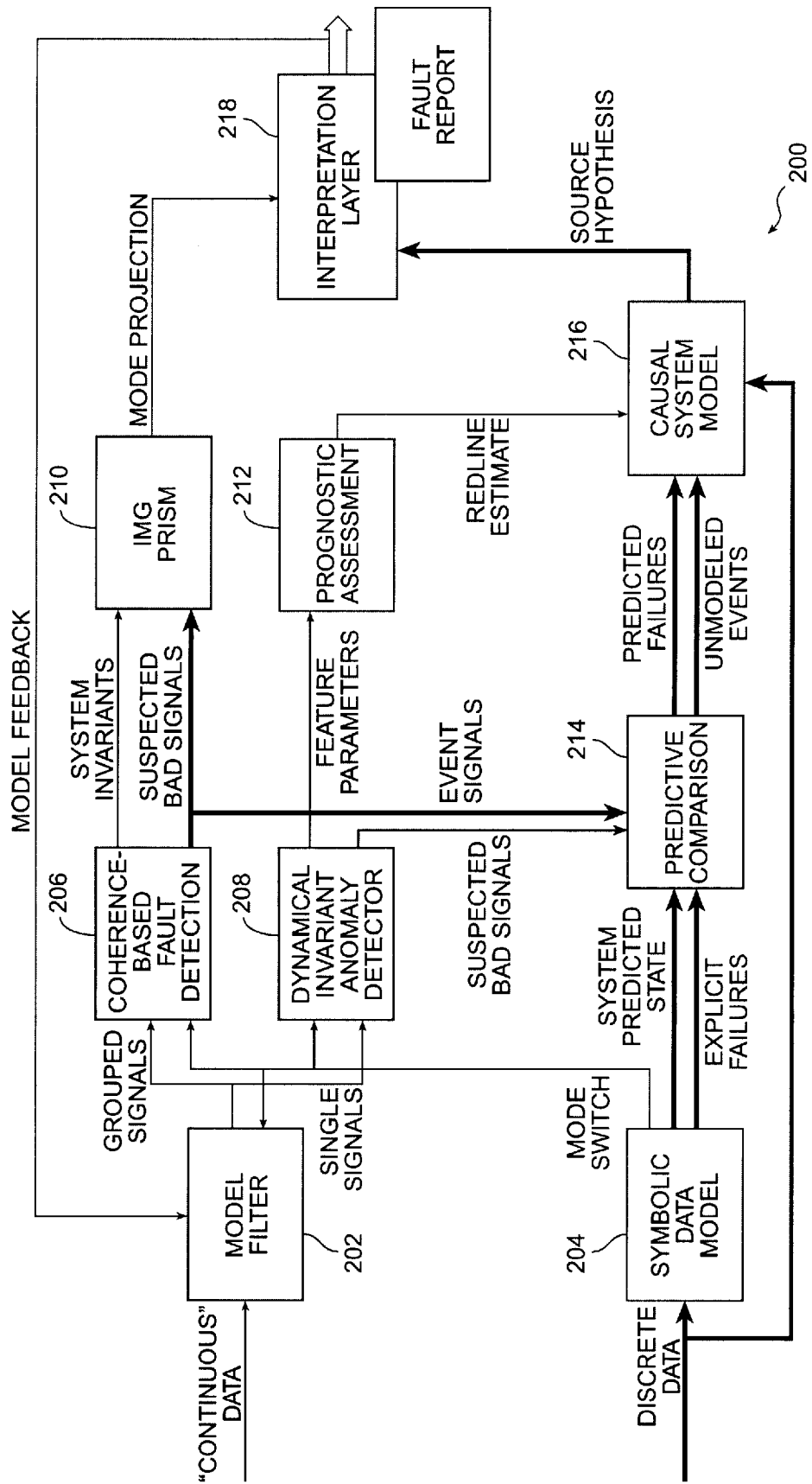
FIG. 2 shows a high level block diagram of an illustrative example of the present invention.

A few notes about the architecture are in order before we consider the individual descriptions of its components. Specifically, we should consider the data flow, which is somewhat complicated:

1. Fixed parameters and command information are input to the specific system models (if any). These are the Symbolic Model and the Physical Model components. These data will not be propagated further and influence other components only through the model outputs.
2. Discrete variables will only be propagated through the symbolic components as indicated in FIG. 2 by the heavy lines. The effect of the symbolic components on the signal processing components is limited to mode determination as indicated.
3. Time-varying quantities are separated into two groups as part of the training process. Specifically, signals with high degrees of correlation to others, or those which are not expected to uniquely indicate a severe fault, are only passed to the Coherence Analysis components. Signals that may uniquely indicate a fault, along with those already flagged as faulty by the coherence analysis, are also passed through the feature extraction components.
4. The split between time-varying signals described in note 3 above is a computational efficiency consideration and reflects general philosophy of operation, but is not essential. Given adequate resources, there is nothing preventing all time-varying signals from being sent to both types of signal analysis at all times.

Following is a summary of the duties of each component. Further clarifying details can be found in Appendix A B C attached herewith.

Model Filter: The model filter 202 combines sensor data with physical model predictions (run in real-time). The model filter, also referred to as the Gray Box, combines sensor data with physical model predictions (run in real-time). We are interested in augmenting sensor data with intuition about the operation of the system. The inclusion of physical models where available is the most efficient means of incorporating domain knowledge into a signal-based processing approach.

The usual methods of signal processing represent "Black Box" strategies; i.e. nothing is known about the internal governing equations of a system. Incidentally, the Dynamical Invariant Anomaly Detector component of an embodiment of the invention is another a black box technique. However, it features analytical methods in accordance with the teachings of the invention and so has merit beyond being a black box device. Such linear approaches are effective in general, but there are profound benefits to simultaneous consideration of sensor and physical information. The opposite perspective would be a "White Box" strategy, where a complete and accurate physical simulation was available for comparison to captured data. This case is desirable but rarely practical. In nearly all cases we must make do with a degraded or simplified model, either because of system complexity or computational limits. The "Gray Box" method serves to make use of whatever models are available, as we will briefly explore in this section.

Any theoretical dynamical model includes two types of components: those directly describing the phenomena associated with the primary function of the system (such as the effect of torque exerted on the turbine shaft on rotor speed), and those representing secondary effects (such as frictional losses, heat losses, etc.). The first type is usually well understood and possesses a deterministic analytical structure, and therefore its behavior is fully predictable. On the other hand, the second type may be understood only at a much more complex level of description (i.e. at the molecular level) and cannot be simply incorporated into a theoretical model. In fact, some components may be poorly understood and lack any analytical description, such as viscosity of water in microgravity. The main idea of this approach is to filter out contributions that are theoretically predictable from the sensor data and focus on the components whose theoretical prediction is lacking. The filtering is performed by the theoretical model itself.

If we assume that the theoretical model is represented by a system of differential equations, known physical processes will be described with state variables and theoretical functions. But we will also have additional terms that describe phenomena for which a full mathematical description is unavailable or too complex. Examples of this include friction in bearings, material viscosity, and secondary effects such as oscillations or flutter in mechanical systems. These leftover terms represent the unknown space of our partial model.

If we substitute sensor data into the theoretical model, so long as the actual system performs as expected, there will be no departure from the model. However, an abnormality in performance will alter the behavior of the "leftover" terms.

In general, we can treat the abnormality as the result of a stochastic process. If the abnormality is small compared to the modeled components of the system, it will suffice to assign some confidence interval for fault detection. However, if the accuracy of the model is poor, we must treat the leftover terms using stochastic or parameter estimation models, as described in following components.

Compared to a straightforward signal analysis method, where highly stable dynamical models are available, the "black box" approach is not only more laborious, but is also less effective since the stochastic forces become deeply hidden in the sensor data. The practical upshot of the gray box approach is to use the theoretical model as a filter, which damps the deterministic components and amplifies the stochastic components, simplifying the task of fault detection for the other components.

Because this approach can operate upon high- and low-fidelity models, it is highly effective as a means of preprocessing sensor data. Such models are available for the majority of autonomous systems, leftover from the design and analysis efforts to build such systems.

To effectively implement this module, one must have such a design model available, or at the very least an approximate physical understanding of the system behavior. Such models must provide "reasonable" agreement with sensor data, and must therefore output directly comparable quantities at similar data rates. This step requires some human intervention, first to cast (or build) the model in a format to produce such results, and second to verify the model's fidelity against a known standard—be that a superior model, an engineering model, or prototype or actual flight data. While the model need not be of precise fidelity to be useful, it is important to confirm the stability of the model and its comparability to sensor information. Use of a poor model will increase the reliance upon signal-based methods downstream, or in extreme cases destabilize the method entirely, in which case only signal-based methods may be applied to the sensor data.

Symbolic Data Model: The symbolic data model 204 interprets status variables and commands to provide an accurate, evolving picture of system mode and requested actions.

In the overall BEAM strategy, real-time measurements are combined with predicted and expected behavior along with predicted performance to quickly isolate candidate faults. The Symbolic Data Model (SDM) is the first line of defense in determining the overall health of the system and it is the primary component that determines its active and predicted states. It operates by examining the values from the system status variables and system commands to provide an accurate, evolving picture of system mode and requested actions. The overall approach afforded by BEAM extends considerably beyond more conventional symbolic reasoning. Since most rule-based diagnostic systems (expert systems) provide only this module and nothing else, they are limited in that they can only identify and diagnose anticipated problems.

Knowledge in the SDM is represented as rules, which are themselves composed of patterns. The rule is the first Aristotelian syllogism in the form: If . . . Then . . . . The variables of the syllogism are joined by the And/Or logical connections. The selector Else points to other cases. This formula is a rule; the rules are sequenced in the succession of logical thinking or pointed at a jump in the sequence (Else→Go To).

Patterns are relations that may or may not have temporal constraints, i.e., may only hold true at certain times or persist for the entire duration of the analysis. Patterns define the constraints that must hold true in order for the antecedent to succeed.

Conceptual representation is the main way to formulate the patterns of the system as part of a computer program. The essential tool the SDM uses is a rule; that is the reason why expert systems can also be called rule-based systems.

The SDM operates by using many small slivers of knowledge organized into conditional If-Then rules. These rules are then operated on in a variety of different ways to perform different reasoning functions.

Unlike the numeric models, the SDM requires a knowledge base in order to perform its analysis functions. From several points of view, representation of knowledge is the key problem of expert systems and of artificial intelligence in general. It is not by chance that the term "knowledge-based systems" has been applied to these products.

The generic features of knowledge are embodied in this representation. In an embodiment of the invention, the domain expert stores the objects, actions, concepts, situations and their relations using the SHINE (Spacecraft High-speed Inference Engine) representation language and this is stored in the SDM knowledge base. The collection of this knowledge represents the sum total of what the SDM will be able to understand. The SDM can only be as good as the domain expert that taught it.

The SDM generates two primary kinds of results: derived states and discrepancies. To provide a uniform representation, we use the identical approach in performing each of these functions and they differ only in their knowledge bases that they use. Derived states are sent on to signal-processing components as well as other discrete components. Discrepancies, as the name implies, are concrete indications of faults.

Coherence-Based Fault Detector: The coherence-based fault detector 206 tracks co-behavior of time-varying quantities to expose changes in internal operating physics. Anomalies are detected from the time-correlated multi-signal sensor data. The method is applicable to a broad class of problems and is designed to respond to any departure from normal operation, including faults or events that lie outside the training envelope.

Also referred to as the SIE (System Invariance Estimator), it receives multiple time-correlated signals as input, as well as a fixed invariant library constructed during the training process (which is itself data-driven using the same time-correlated signals). It returns the following quantities:

1. Mode-specific coherence matrix
2. Event detection
3. Comparative anomaly detection
4. Anomaly isolation to specific signals
5. Distance measure of off-nominal behavior As a first step of analysis, this computation makes a decision whether or not a fault is present, and reduces the search space of data to one or a few signals. Time markers are included to indicate the onset of faulted data. These conclusions, which can be drawn for nearly any system, are then passed to other analysis components for further feature extraction, correlation to discrete data events, and interpretation.

To motivate a cross-signal approach, consider that any continuously valued signal, provided it is deterministic, can be expressed as a time-varying function of itself, other signals, the environment, and noise. The process of identifying faults in a particular signal is identical to that of analyzing this function. Where the relationship is constant, i.e. follows previous assumptions, we can conclude that no physical change has taken place and the signal is nominal. However, the function is likely to be extremely complex and nonlinear. Environmental variables may be unmeasurable or unidentified. Lastly, the interaction between signals may be largely unknown. For this reason it is more efficient to study invariant features of the signals rather than the entire problem.

Because we do have the different signal measurements available, we can consider relationships between signals separately and effectively decouple the problem. A good candidate feature is signal cross-correlation. By studying this or a similar feature rather than the raw signals, we have reduced our dependence on external factors and have simplified the scope of the problem.

In the case of the SIE we will use a slightly different feature across pairs of signals, which we refer to as the coherence coefficient. It is chosen instead of the ordinary coefficient of linear correlation in order to take advantage of certain "nice" mathematical properties. This coefficient, when calculated for all possible pairs of N signals, describes an N×N matrix of values. The matrix is referred to as the Coherence Matrix of the system.

The coherence matrix, when computed from live streaming data, is an evolving object in time with repeatable convergence rates. Study of these rates allows us to segment the incoming data according to mode switches, and to match the matrix against pre-computed nominal data.

For the purpose of this discussion, a "Mode" refers to a specific use or operation of the system in which the coherence coefficients are steady. In other words, the underlying physical relationships between parameters may change, but should remain constant within a single mode. These modes are determined from training data for the purpose of detector optimization. Ordinarily they do correspond to the more familiar "modes," which represent specific commands to or configurations of the system, but they need not be identical. Frequently such commands will not appreciably alter the physics of the system, and no special accounting is needed.

Comparison of the runtime coherence matrix to a pre-computed, static library of coherence plots, taking into account the convergence behavior of the computation, is an effective means of anomaly detection and isolation to one or more signals.

Unfortunately, this comparison is only meaningful if we can guarantee our present coherence values do not reflect mixed-mode data, and so some method of segmentation must be found. For purposes of anomaly detection, mode boundaries can be detected by monitoring the self-consistency of the coherence coefficients. As each new sample of data is included into the computation, a matrix average for the resulting change is extracted and compared against the expected convergence rate. A change in the convergence rate implies a new mode has been entered and the computation must be restarted.

Between detected mode transitions, the difference between the computed and expected coherence allows us to optimally distinguish between nominal and anomalous conditions. Violation of this convergence relationship indicates a shift in the underlying properties of the data, which signifies the presence of an anomaly in the general sense. The convergence rate of this relationship, used for fault detection, is considerably slower than that for data segmentation, though still fast enough to be practical.

Once a fault has been indicated, the next step is to isolate the signals contributing to that fault. This is done using the difference matrix, which is formed from the residuals following coherence comparison against the library.

Because nearly every autonomous system relies upon performance data for operation as well as fault protection, this method is applicable to a wide variety of situations. The detector increases in accuracy as the number of sensors increases; however, computational cost and mode complexity eventually place a practical limit on the size of the system to be treated. At the extremes, this method has been successfully applied to systems as small as four sensors and as complex as 1,600 of radically varying type.

The analysis involves computation of an N×N matrix, and therefore the computation scales quadratically with the number of signals; fortunately, most designs are implicitly hierarchical, allowing the problem to be separated if computational costs are too great. Furthermore, typical systems or subsystems exhibit a reasonable number of sensors for this method given the state-of-the-art in flight processors. A real-world example of this technique using a single embedded flight processor (PowerPC clocked at 200 MHz) demonstrated real-time capability on a 240-sensor system sampled at 200 Hz.

Another key virtue of this approach is its resilience in the face of novelty. The coherence between signals is a very repeatable property in general, especially as compared to environmental variable or nonlinear terms in the signals themselves. This repeatability allows us to quickly determine whether or not the coherence is consistent with any of the training data, and therefore can be used as an efficient novelty detector, regardless of its cause.

Training of this component is entirely data-driven. In order to be most effective, the component should be trained with examples of nominal operating data covering every major mode of operation. These examples should be sufficiently detailed to capture the expected system dynamics. While the actual training of the detector is completely autonomous once the task of separating nominal and anomalous data has been performed, this task—and the collection of the data—can be difficult.

In cases where the training data is difficult to obtain or identify, the component functions best in a "learning" mode, similar to its performance following anomaly detection. If we expect to see novel data that does not indicate faults, we must provide for a feedback to the detector, which is a human-intensive process. Novel data can be tagged by the detector and archived for study. Following classification as nominal or anomalous, the detector can "retrain" using this data and continue. This technique has been used effectively in the study of untested systems.

In cases where sensor data is relatively isolated, or when sample rates preclude the resolution of system dynamics, this method is not likely to be effective. These cases place a much greater reliance upon the symbolic method components of BEAM.

Dynamical Invariant Anomaly Detector: The dynamical invariant anomaly detector 208 tracks parameters of individual signals to sense deviations. The dynamical invariant anomaly detector is designed to identify and isolate anomalies in the behavior of individual sensor data.

Traditional methods detect abnormal behavior by analyzing the difference between the sensor data and the predicted value. If the values of the sensor data are deemed either too high or low, the behavior is abnormal. In our proposed method, we introduce the concept of dynamical invariants for detecting structural abnormalities.

Dynamical invariants are governing parameters of the dynamics of the system, such as the coefficients of the differential (or time-delay) equation in the case of time-series data. Instead of detecting deviations in the sensor data values, which can change simply due to different initial conditions or external forces (i.e. operational anomalies), we attempt to identify structural changes or behavioral changes in the system dynamics. While an operational abnormality will not lead to a change in the dynamical invariants, a true structural abnormality will lead to a change in the dynamical invariants. In other words, the detector will be sensitive to problems internal to the system, but not external disturbances.

We start with a description of a traditional treatment of sensor data given in the form of a time series describing the evolution of an underlying dynamical system. It will be assumed that this time series cannot be approximated by a simple analytical expression and does not possess any periodicity. In simple words, for an observer, the future values of the time series are not fully correlated with the past ones, and therefore, they are apprehended as random. Such time series can be considered as a realization of an underlying stochastic process, which can be described only in terms of probability distributions. However, any information about this distribution cannot be obtained from a simple realization of a stochastic process unless this process is stationary—in this case, the ensemble average can be replaced by the time average. An assumption about the stationarity of the underlying stochastic process would exclude from consideration such important components of the dynamical process as linear and polynomial trends, or harmonic oscillations. Thus we develop methods to deal with non-stationary processes.

Our approach to building a dynamical model is based upon progress in three independent fields: nonlinear dynamics, theory of stochastic processes, and artificial neural networks.

After the sensor data are stationarized, they are fed into a memory buffer, which keeps a time history of the sensor data for analysis. We will study critical signals, as determined by the symbolic components of BEAM, the operating mode, and the cross-signal methods outlined above. The relevant sensor data is passed to a Yule-Walker parameter estimator. There, the dynamical invariants and the coefficients of the time-delay equation are computed using the Yule-Walker method.

Once the coefficients are computed, they will be compared to the ones stored in a model parameter database. This contains a set of nominal time-delay equation coefficients appropriate for particular operating mode. A statistical comparison will be made between the stored and just-computed coefficients using a bootstrapping method, and if a discrepancy is detected, the identity of the offending sensor will be sent on.

Further analysis is carried out on the residual or the difference between the sensor data values and the model predicted values, i.e. the uncorrelated noise, using a nonlinear neural classifier and noise analysis techniques. The nonlinear neural classifier is designed to extract the nonlinear components, which may be missed by the linear Yule-Walker parameter estimator. The weights of the artificial neural network, another set of dynamical invariants, will be computed and compared with nominal weights stored in the model parameter database. Similarly, the noise characteristics, such as the moments of probability distribution, are dynamic invariants for stationarized sensor data, and will be compared with those stored in the Model Parameter Database. If any anomalies are detected in either the nonlinear components or the noise, the identity of the sensor will be sent to the channel anomaly detector.

Finally, the channel anomaly detector aggregates information from the Yule-Walker parameter estimator, nonlinear neural classifier, and noise analysis modules, and classifies the anomaly before sending the fault information to the Predictive Comparison module, which is discussed below.

Like the SIE described above, training of this detector is data-driven. It has similar requirements in terms of data set and human involvement. Also like the SIE, insufficient data training will result in false alarms, indicating novelty, until data collection and review during flight operations produce a sufficiently large data set to cover all nominal operating modes.

Also like the SIE, this method is only likely to be effective if system dynamics are captured in the sensor data. However, this method is effective on isolated sensors, though it is often not sensitive to interference or feedback faults that manifest on no particular sensor.

Informed Maintenance Grid (IMG): (Optional) The informed maintenance grid 210 studies evolution of cross-channel behavior over the medium- and long-term operation of the system. Tracking of consistent deviations exposes degradations and lack of performance. This component is optional and is not a necessary component to the operation of the invention.

The IMG itself is a three-dimensional object in information space, intended to represent the evolution of the system through repeated use. The IMG is constructed from results from the SIE described above, specifically the deviations in cross-signal moments from expected values, weighted according to use and averaged over long periods of operation. The cross-signal moments are a persistent quantity, which amplifies their value in long-term degradation estimation.

There are two convincing reasons to consider cross-signal residuals in this fashion. First is the specific question of degradation and fault detection. Degradation typically manifests as a subtle change in operating behavior, in itself not dramatic enough to be ruled as a fault. This emergent behavior frequently appears as subthreshold residuals in extracted signal features. As described above, statistical detection methods are limited in sensitivity by the amount of data (both incident and training data) that can be continuously processed. However, tracking of consistent residuals over several such experiments can lead to a strong implication of degraded performance.

The second reason addresses functional health of the system. In addition to tracking the magnitude and consistency of residuals arising from degradation, we can also observe their spread to other signals within the system and track their behavior relative to different modes of usage.

The IMG produces a long-term warning regarding system-wide degradations. This differs slightly from the companion Prognostic Assessment module, which concerns itself with individual signals and preestablished operating limits. However, the IMG is also useful with regard to novel degradations. Such are the norm with new advanced systems, as predicting degradation behavior is very difficult and much prognostic training must be done "on the job."

Visually, the three-dimensional object produced by the IMG is an easily accessible means of summarizing total system behavior over long periods of use. This visual means of verifying IMG predictions makes BEAM easily adapted for applications with human operators present.

Prognostic Assessment: The prognostic assessment component 212 makes a forward-projection of individual signals based on their model parameters. Based upon this, it establishes a useful short-term assessment of impending faults.

The channel level prognostics algorithm is intended to identify trends in sensor data which may exceed limit values, such as redlines. This by itself is a common approach. However, given the richness of feature classification available from other BEAM components, it is highly effective to update this procedure. A stochastic model similar in principle to the auto-regressive model is used to predict values based upon previous values, viz. forecasting. The aim is to predict, with some nominal confidence, if and when the sensor values will exceed its critical limit value. This permits warning of an impending problem prior to failure.

In general, time-series forecasting is not a deterministic procedure. It would be deterministic only if a given time series is described by an analytical function, in which case the infinite lead time prediction is deterministic and unique based upon values of the function and all its time derivatives at t=0. In most sensor data, this situation is unrealistic due to incomplete model description, sensor noise, etc. In fact, present values of a time series may be uncorrelated with previous values, and an element of randomness is introduced into the forecast.

Such randomness is incorporated into the underlying dynamical model by considering the time series for $t \leq 0$ as a realization of some (unknown) stochastic process. The future values for $t>0$ can then be presented as an ensemble of possible time series, each with a certain probability. After averaging the time series over the ensemble, one can represent the forecast as the mean value of the predicted data and the probability density distributions.

The methodology of time series forecasting is closely related to model fitting and identification. In general, the non-stationary nature of many sensor data may lead to misleading results for future data prediction if a simple least-square approach to polynomial trend and dominating harmonics is adopted. The correct approach is to apply inverse operators (specifically difference and seasonal difference operators) to the stationary component of the time series and forecast using past values of the time series.

To implement this module, we begin by feeding a Predictor stationary data, the auto regressive model coefficients, past raw data values, and limit values; i.e., everything required to evaluate the prediction plus a redline value at which to stop the computation. The predictor will generate many predictions of time to redline and pass them on to the Redline Confidence Estimator. The Redline Confidence Estimator will then construct a probability distribution of the time when the channel value will exceed the redline limit. Finally, the Failure Likelihood Estimator takes the probability distribution and computes the likelihood (probability) that the channel value may exceed the redline value within some critical time. If the probability exceeds a certain preset threshold as determined by the application, e.g. 99% confidence, then the critical time and its probability will be sent to the symbolic components.

Predictive Comparator: The predictive comparator component 214 compares the requested and commanded operation of the system versus the sensed operation as interpreted from the time-varying quantities. Its goal is to detect misalignment between system software execution and system hardware operation. This is a principal concern, as we are dealing with systems that rely on a large degree of software control, if not complete autonomy.

Causal System Model: The causal system model 216 is a rule-based connectivity matrix designed to improve source fault isolation and actor signal identification. In the SDM, the entire domain knowledge is represented as If-Then rules only. When the domain is very large and complex, an entirely rule-based representation and associated inference leads to a large and inefficient knowledge base, causing a very poor focus of attention. To eliminate such unwieldy knowledge bases in the SDM engine, we provide a causal system model. This component simplifies the problem by looking for relationships between observations in the data to fill in blanks or gaps in the information from the SDM.

Interpretation Layer: The interpretation layer 218 collates observations from separate components and submits a single fault report in a format usable to recovery and planning components or to system operators. It submits a single fault report in a format usable to recovery and planning components (in the case of a fully autonomous system) or to system operators. This is a knowledge-based component that is totally dependent upon the domain and the desired format of the output.

In the following sections, we will examine the individual components in additional detail.

4.0 Component Descriptions 4.1 Coherence-based Fault Detection (SIE)

A coherence-based fault detector 206 according to the invention is a method of anomaly detection from time-correlated sensor data. In and of itself, the coherence-based fault detector is capable of fault detection and partial classification. The method is applicable to a broad class of problems and is designed to respond to any departure from normal operation of a system, including faults or events that lie outside the training envelope. Further examples and clarifying details of this aspect of the invention can be found in Appendix C attached herewith.

In an embodiment of the invention, the coherence-based fault detector 206 is based on a System Invariance Estimator (SIE) which is a statistical process for examining multi-signal data that lies at the heart of this aspect of the invention. As input, the coherence-based fault detector receives multiple time-correlated signals. The detector compares their cross-signal behavior against a fixed invariant library constructed during a training process (which is itself data-driven using the same time-correlated signals). It returns the following quantities:

Mode-specific coherence matrix

Event detection

Comparative anomaly detection

Anomaly isolation to specific signals

Distance measure of off-nominal behavior

As a first step of analysis, this computation makes a decision whether or not a fault is present, and reduces the search space of data to one or a few signals. Time markers are included to indicate the onset of faulted data. These conclusions, which can be drawn for nearly any system, are then passed to other analysis components for further feature extraction, correlation to discrete data events, and interpretation.

4.1.1 Cross-signal Motivation

In this section we will motivate the cross-signal approach to fault detection. Because quantitative information is so readily available, approaches grounded in signal processing are likely to be effective. The method described here has two distinct advantages. The first is its broad range of applicability—the module described here has been used to successfully fuse sensor and computed data of radically different types, on numerous systems, without detailed system knowledge and with minimal training. The second is its ability to detect, and with few exceptions correctly resolve, faults for which the detector has not been trained. This flexibility is of prime importance in systems with low temporal margins and those with complex environmental interaction.

Consider a continuously valued signal obtained for example by a sensor measuring some aspect of a system, sampled uniformly. Provided this signal is deterministic, it can be expressed as a time-varying function:

$$S_i = f(\{S_i(t-dt)\}, \{E(t)\}, \epsilon(t)) \quad (4.1.1)$$

In the above expression, we have identified the signal as a function of itself and other signals, as expressed by $\{S_i(t)\}$, and of the environment, which may contain any number of relevant parameters $\{E(t)\}$. There is also a noise term $\epsilon(t)$ included to reflect uncertainties, in particular actual sensor noise that accompanies most signals in practice.

The process of identifying faults in a particular signal is identical to that of analyzing the function $f(t)$. Where this relation remains the same, i.e. follows the original assumptions, we can conclude that no physical change has occurred for that signal, and therefore the signal is nominal. Such is the approach taken by model-based reasoning schemes.

However, the function $f$ for each signal is likely to be extremely complex and nonlinear. The environmental variables may be unknown and unmeasurable. Lastly, the specific interaction between signals may also be unknown, for instance in the case of thermal connectivity within a system. For this reason, it is more efficient and more generally applicable to study invariant features of the signals rather than the full-blown problem.

One excellent candidate feature for study is cross-correlation between signals. By studying this computed measurement rather than signals individually, we are reducing the dependence on external factors (i.e. environmental variables) and thus simplifying the scope of the problem.

Cross-correlative relationships between signals, where they exist, remain constant in many cases for a given mode of system operation. The impact of the operating environment, since we are dealing with time-correlated signals, applies to all signals and thus can be minimized. This approach is essentially the same as decoupling the expression above, and choosing to study only the simpler signal-to-signal relationships, as follows:

$$S_i = f(\{S_i(t-dt)\})°g(\{E(t)\})°\epsilon(t) \quad (4.1.2)$$

For a realistic system, this hypothesis is easy to support. In most cases, relationships between signals that represent measured quantities are readily apparent. The environmental contribution can be considered an external input to the system as a whole rather than being particular to each signal. The sensor itself is the source of most of the noise, and it too can be separated. Even where such separability is not explicitly valid, it is likely to be a good approximation.

We must retain a consideration to operating mode hinted at above. For the purpose of this discussion, a mode implies a particular set of relational equations that govern each signal. In other words, the operating physics of the system can differ between modes but is assumed to be constant within a mode. These modes are ordinarily a direct match to the observable state of the system; i.e., inactive, startup, steady-state, etc. Mode differs from the external environment in that it is a measure of state rather than an input to the system's behavior.

Provided we can correctly account for operating mode, we then have a much simplified set of relations to study, namely those between pairs of signals, or in the more general sense each signal versus the larger system. Faults in the system can be expected to manifest themselves as departures from the expected relationships. For this reason, the study of correlations between the signals is singularly useful as a generic strategy.

4.1.2 Coherence Estimation

Two common measures of second-order cross-signal statistics are the Covariance and the Coefficient of Linear Correlation. Covariance is a good measure of similar behavior between arbitrary signals, but it suffers from a number of difficulties. One such problem is that a covariance matrix will be dominated by the most active signals, viz. those with the greatest variance. In order to avoid this, covariance is typically normalized by the relative variances of the signals, as in the Correlation Coefficient. However, such a normalization is often overly simplistic and leads to the inverse problem. A correlation matrix tends to become ill-conditioned in the presence of signals with relatively low variances.

Returning to the original goal, we are interested in comparing signals. This should take into account both the covariance and the relative variances of the signals. In accordance with the invention, we define a coherence coefficient expressed below as:

$$\zeta_{ij} = \frac{|\text{Cov}(S_i, S_j)|}{\text{Max}(\text{Var}(S_i), \text{Var}(S_j))}. \quad (4.1.3)$$

We have used the standard definitions:

$$\text{Cov}(S_i, S_j) = \frac{1}{t}\int (S_i - \bar{S}_i)(S_j - \bar{S}_j)dt \quad (4.1.4)$$

$$\text{Var}(S_i) = \frac{1}{t}\int (S_i - \bar{S}_i)^2 dt \quad (4.1.5)$$

The choice of the maximum variance in the denominator guarantees a coherence coefficient value normalized to [−1, 1]. Furthermore, the absolute value is taken because the sign of the relation is of no importance for arbitrary signals, only the existence or nonexistence of a causal connection. A coherence value close to 0 implies no relationship between signals, whereas a value approaching 1 indicates a very strong relationship. Consequently, the coherence coefficient is normalized to [0,1].

Given N data streams, this calculation defines an N×N coherence coefficient matrix where each entry represents a degree of causal connectivity. Where relationships between signals are fixed, i.e. during a single mode of system operation, the coherence coefficient between those two signals will remain constant within the bounds of statistical uncertainty. Provided the coherence coefficient converges, this relationship is repeatable, and so it cab be used as a basis for comparison between training and run-time data.

Admittedly the above assertions are too strict for a real-world example. Systems may indeed contain signals with fluctuating or drifting relationships during nominal operation. Additionally, the requirement to maintain a countable number of modes may force us to simplify the system state model, to the detriment of repeatability. We will examine modifications to the above to mitigate these concerns.

4.1.3 Event Detection

Having understood that cross-channel measurements are an effective method of signal analysis, we next explore how to best apply the calculation above. A first question to ask is how the data should be gathered. From the discussion above, it is noted that we should avoid applying this operator to mixed-mode data. Such data represents a combination of two separate sets of underlying equations for the signals, thus mixed-mode correlations are not necessarily repeatable.

A mode ("mode of operation", "system mode", etc.) signifies a different type of system operation. Let's say we were going to build a numerical simulation of the system. For each mode, we need a separate model, or at least model components special to that mode. Different system operation can be caused by a configurational change or significant environmental change. A system may enter a new mode of operation by command or as a consequence of a faults.

Consider an automobile engine, for example. While "Off" it would be in one (very boring) mode. "Start" would be another, which is different from "Run" because during "Start" the electric starter is active. Once in "Run," changing fuel rates to accelerate would not be considered a new mode—basic operation is not changed, a model of operation for the engine would not require different equations. The transition from "Off" to "Start" to "Run" is commanded by the driver. Using this same example, fault modes might also be configurational or environmental. A fuel pump degradation might put the engine into the "Lean" faulty mode. Poor quality gasoline (using octane rating as an environmental variable) might result in "pinging." Faults can also be commanded, for instance turning on the starter while the engine is already running, resulting in a superposition of "Run" and "Start" modes that is different from both and outside the design specifications of the engine.

Typical applications avoid the issue of mode switching through one of the following methods:

a) Compute only correlations having a fixed, mode-independent relationship.

This method is effective in reliable fault detectors, however the system coverage is typically very limited. The method is restricted to well-understood signal interactions and is not generalizable. (However, see Section 4.1.5, where we attempt to redress this philosophy.)

b) Window the data such that near-steady-state operation can be assumed.

This procedure also carries significant inherent limitations. Because the computation, whichever is used, is statistical in nature, selection of a fixed window size places a hard limit on latency as well as confidence of detection. This also does not directly address the core problem.

c) Window the computation according to external state information, such as commands.

This is the best approach, and it is used in the full formulation of BEAM. However, it too has limits.

External state information may not be available. Additionally, there may not be a perfect alignment between discrete "operating modes" and observable shifts in the system—it may not be one-to-one.

Our solution to the mixed-mode problem in accordance with the invention is based upon the following observations. Consider a pair of signals with a fixed underlying linear relationship, subject to Gaussian (or any other zero-mean) random noise. The coherence calculation outlined in Section 4.1.2 above will converge to a fixed value, according to the following relationship:

$$\zeta_{ij}(t) - \zeta_{ij}(t-1) \sim \frac{1}{t^2} \quad (4.1.6)$$

The exact rate of convergence depends on the relative contribution from signal linear and noise components as well as the specific character of signal noise. However, in practice, it is much easier to determine the relationship empirically from sampled data.

Given the convergence relationship above, we can define a data test in order to assure single-mode computation. By adopting this approach, we can successfully separate steady-state operation from transitions. This means:

a) Transition detection is available for comparison to expected system behavior.

A "transition" in this case is a switch from one mode to another. Most of these are predictable and nominal. On the other hand, a broad class of system faults can be considered transitions, particularly those involving sudden electrical failure or miscommand scenarios. Unexpected events in the system immediately merit further analysis.

b) Calculated coherence uses the maximum amount of data available to make its decisions, which optimizes sensitivity and confidence.

Use of the convergence rate establishes a time-varying estimate of confidence in the calculation, which is transparent to the final output of the detector. The time-variance also applies to the values of the computed coherence, which we will study in further detail in the following section.

The quantity $$p(t) = \zeta_{ij}(t) - \zeta_{ij}(t-1)$$

is computed and referred to as the coherence stability. This single parameter is a good indicator of steady-state behavior.

One observation regarding stability is that the convergence rate is quite fast. This character allows us to make confident decisions regarding mode transitions with relatively little data to study. This also lends credibility to more complex and subtle fault detection using a coherence-based strategy.

4.1.4 Comparative Fault Detection

In the previous section, we identified a method to qualify data entering the detector in terms of mode consistency based upon convergence properties of the calculation. Next we will use a similar strategy to differentiate between nominal and faulty data, where the fault manifests itself as a drift rather than a transition. Such a fault case is more physically interesting than a sudden transition, since we are concerned about a lasting effect upon the system rather than an instantaneous data error. Suppose we have a current $\zeta_{ij}(t)$ estimate that we are comparing to a different estimate, call it $\zeta_0$. As we accumulate more data, the estimate is expected to converge at the following rate:

$$|\zeta_{ij}(t) - \zeta_0| \sim \sqrt{\frac{1}{t}} \quad (4.1.7)$$

This relationship determines the accuracy of the calculation's raw value, which is representative of the equation between the two signals. It is conceptually similar to the error in estimated mean for a statistical sampling process. We can use this relationship to detect a shift in the equations, much in the manner that events are detected above.

The computed quantity $|\zeta_{ij}(t)-\zeta_0|$ is calculated and referred to as the coherence deviation. When compared with the base convergence rate, it is a measurement of confidence that the coherence relationship is repeating its previous (nominal) profile. Between detected mode transitions, as discussed in the previous sections, use of this relationship allows us to optimally distinguish between nominal and anomalous conditions. Violation of this convergence relationship indicates a shift in the underlying properties of the data, which signifies the presence of an anomaly in the general sense.

Note that the convergence rate of this relationship is considerably slower, though still fast enough to be practical. Because of this, it is particularly valuable to adapt a variable-windowing scheme where data is automatically segmented at mode boundaries.

4.1.5 Optimization

The sections above define a method of generic cross-signal computation and identify properties that facilitate decisions about the data. In this section we will examine how to best apply these properties.

The convergence properties above are written for each individual signal pair. In order to apply this approach in general to a system with N signals, we have $O(N^2)$ signal pairs to process. At first glance, the approach does not appear to lend itself to scaling. For this reason, most cross-signal approaches focus on preselected elements of the matrix, which cannot be done without considerable system knowledge or examples of anomalous data from which to train.

However, there are some advantages to studying the full matrix. For the general case, we may not know a priori which signal pairs are significant. Additionally, there are likely to be numerous interactions for each signal, which may vary depending on the mode of operation. Only in rare cases are the individual elements of the matrix of particular interest. In the general case, we are concerned with signal behavior versus the entire system, which corresponds to an entire row on the coherence matrix.

Because we are more concerned with the overall system performance, we should instead consider a single global measure based on the entire matrix. This requires some sort of matrix norm.

Many matrix norms exist. In this particular embodiment of the invention, we shall use the following, where M is an arbitrary N-by-N matrix:

$$\|M\| = \frac{1}{N^2} \sum_i \left| \sum_j M_{ij} \right|. \quad (4.1.8)$$

The norm chosen here differs from the simple matrix average in one detail, namely the absolute value and its placement. An absolute value is used because we are principally concerned with the magnitude of differences between one matrix and another, rather than their sign. (An exception to this: Following the detection of an anomaly, for purposes of identification the sign can be important, as faults that cause an increase in coherence are typically more physically complex and more interesting.) The choice to average row totals rather than each individual element is motivated by the inherent structure of the coherence matrix, specifically the fact that each row represents a single signal's total contribution. By averaging the rows prior to their summation we hope to counteract noise present in the calculation, whereas differences due to a significant shift are likely to be of the same sign.

We can substitute the norm into the convergence relationships Eq. (4.1.6) and Eq. (4.1.7) above without changing their character:

$$\|\zeta_{ij}(t) - \zeta_{ij}(t-1)\| \sim \frac{1}{t^2}, \text{ and} \quad (4.1.9)$$

$$\|\zeta_{ij}(t) - \zeta_0\| \sim \sqrt{\frac{1}{t}}, \quad (4.1.10)$$

where M in Eq. (4.1.8) is replaced with $(\zeta_{ij}(t)-\zeta_{ij}(t-1))$ and $(\zeta_{ij}(t)-\zeta_0)$ respectively, and $N=i \times j$.

The stability and deviation on the left are now indicative of the entire matrix. This produces a tradeoff between individual pair sensitivity and false-alarm reduction, while at the same time greatly reducing computational cost.

Another adaptation to this approach is to consider separate weighting of different pairs. It is clear that some signal pair relationships will be well defined while others will be pseudorandom. Additionally, we have adopted the concept of multiple modes to handle different relationships at different phases of system operation. This can become an unbounded problem, and a mechanism is needed to guarantee a small number of modes.

Let us introduce a weighting matrix $W_{ij}$ into the convergence relationships above:

$$\|W_{ij}\zeta_{ij}(t) - W_{ij}\zeta_{ij}(t-1)\| \sim \frac{1}{t^2} \quad (4.1.11)$$

$$\|W_{ij}\zeta_{ij}(t) - W_{ij}\zeta_0\| \sim \sqrt{\frac{1}{t}} \quad (4.1.12)$$

The matrix $W_{ij}$ is a companion to the training matrix $\zeta_0$ and is computed as part of the training cycle. For a general application, i.e. an application for which no signal relationships are known or suspected, it is computed by normalizing each signal pair coherence by the observed variance in that coherence. This normalization matrix, along with the model coherence $\zeta_0$, can be later combined with other coherence/normalization pairs in order to combine modes or enhance training data results with new data.

4.1.6 Post-processing

If an unknown fault has been detected, the next step is to isolate the responsible signals. This is done by studying the difference matrix:

$$D_{ij}=W_{ij}(\zeta_{ij}(t)-\zeta_0) \quad (4.1.13)$$

Given an anomaly on one signal, we expect to see the correlation between this signal and all others diminish compared to the expected values. There may be stronger shifts between some signals and others, but in general the coherence values will decrease. Visually this leads to a characteristic "cross-hair" appearance on the rendered difference matrix.

The total deviation for each signal is computed by summing the coherence difference (absolute values) over each row of the matrix. The ranking module 306 provides a ranking of these deviations to determine the most likely contributors to the faults. This channel implication is passed to interpretive elements of the invention and to single-signal analysis modules.

In general an anomaly will manifest as a decrease in coherence between signals. However, there are rare cases where coherency will increase. Typically this is not system-wide but is isolated to a few specific pairs. Such an increase in coherency is indicative of a new feedback relationship occurring in the system, and it must be given special attention.

Such cases, physically, define previously unknown modes of the system. This mode may be nominal or faulty. In the former case, such detection implies that the training data used to tune the detector does not adequately cover the operations space, and must be expanded. In the latter case, knowledge of what specific signals or pairs are anomalous can directly lead to better understanding of the problem, particularly in cases where causal or physical models are available to the diagnostic engine.

The underlying principle is that large deviances (taking weighting into account) are probably key contributors. However, in addition to this is the question of phase. Signal pairs that show a positive phase, i.e., increased coherence, are more interesting than signal pairs that show a decreased coherence. Furthermore, a signal that shows an increase in coherence with a particular signal, but with a decrease with respect to all other signals is remarkable and thus of great interest. Such signals are identified by the key signals module 310.

4.1.7 Architecture

Figure 3:
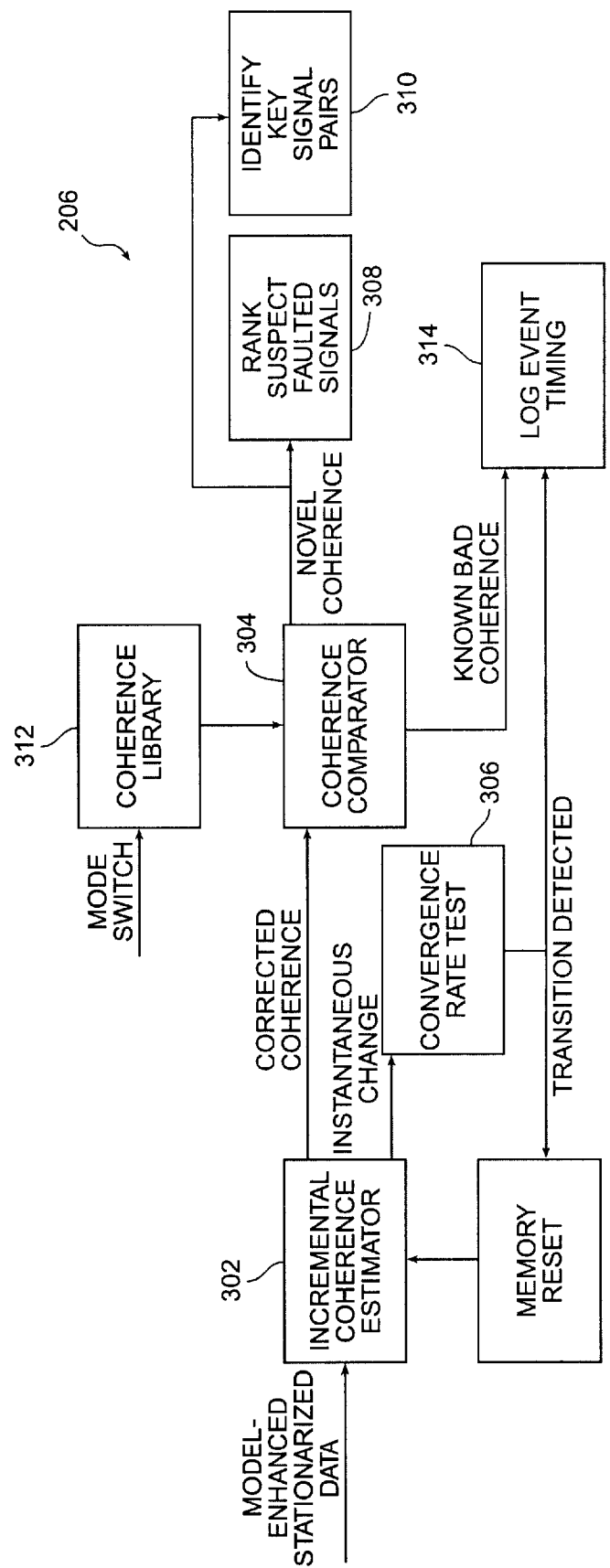
FIG. 3 is a high level block diagram of the coherence-based fault detector illustrated in FIG. 2.

We have discussed an underlying theory for cross-signal event and fault detection. An operating architecture to implement this approach is given in FIG. 3.

Each sample of time-correlated, stationarized data is passed to the Incremental Coherence Estimator 302, where Eq. (4.1.3) is updated for each signal pair. The coherence stability is computed over the matrix, and is checked against relationship Eq. (4.1.11) in the Convergence Rate Test 306. If this test fails, this indicates the presence of mixed mode data and so the coherence estimate is reset for another pass. This is repeated until the relationship Eq. (4.1.11) is satisfied.

After the test above, we are guaranteed a coherence estimate free of mixed-mode data. The estimate is compared against the expected coherence supplied by the Coherence Library 312, as selected by the symbolic model 204 and command data. The match is checked against relation Eq. (4.1.12) by the Coherence comparator 304.

If we have a mismatch that compares favorably to an abnormal library coherence, we have a known fault, which will be flagged according to the fault number and passed to the interpreter. This is the "known bad coherence" path shown in FIG. 3.

If we cannot find a suitable match, as is more frequently the case, the differenced coherence Eq. (4.1.13) is examined to extract the key actor signals and pairs. This processing is discussed above in Section 4.1.6.

At the end of this operation, we will have successfully identified normal versus anomalous operation of the system as a whole. For those cases where anomalous conditions are detected, we have isolated the effect to a known case or to the key measurements that led us to that conclusion. This has, in essence, digitized the problem into terms that the interpreter can understand, as will be discussed in section 4.5 below.

4.2 Single Channel Feature Extraction

The Dynamical Invariant Anomaly Detector 208 is designed to identify and isolate anomalies in the behavior of individual sensor data. Traditional methods detect abnormal behavior by analyzing the difference between the sensor data and the predicted value. If the values of the sensor data are deemed either too high or low, the behavior is abnormal. In accordance with the present invention, we introduce the concept of dynamical invariants for detecting structural abnormalities. Dynamical invariants are governing parameters of the dynamics of the system, such as the coefficients of the differential (or time-delay) equation in the case of time-series data. Instead of detecting deviations in the sensor data values, which can change simply due to different initial conditions or external forces (i.e. operational anomalies), we attempt to identify structural changes or behavioral changes in the system dynamics. While an operational abnormality will not lead to a change in the dynamical invariants, a true structural abnormality will lead to a change in the dynamical invariants. In other words, the detector will be sensitive to problems internal to the system, but not external disturbances.

4.2.1 Dynamical Model

We start with a description of a traditional treatment of sensor data given in the form of a time series describing the evolution of an underlying dynamical system. It will be assumed that this time series cannot be approximated by a simple analytical expression and does not possess any periodicity. In simple words, for an observer, the future values of the time series are not fully correlated with the past ones, and therefore, they are apprehended as random. Such time series can be considered as a realization of an underlying stochastic process, which can be described only in terms of probability distributions. However, any information about this distribution cannot be obtained from a simple realization of a stochastic process unless this process is stationary. (In this case, the ensemble average can be replaced by the time average.) An assumption about the stationarity of the underlying stochastic process would exclude from consideration such important components of the dynamical process as linear and polynomial trends, or harmonic oscillations. In accordance with the invention, we provide methods to deal with non-stationary processes.

Our approach to building a dynamical model is based upon progress in three independent fields: nonlinear dynamics, theory of stochastic processes, and artificial neural networks. From the field of nonlinear dynamics, based upon the Takens theorem, any dynamical system which converges to an attractor of lower (than original) dimensionality can be simulated (with a prescribed accuracy) by a time-delay equation:

$$x(t) = F[x(t-\tau), \ldots x(t-2\tau), \ldots, x(t-m\tau)], \quad (4.2.1)$$

where $x(t)$ is a given time series, and $\tau$=constant is the time delay. The function F represents some deterministic function representative of the system.

It was proven that the solution to Eq. (4.2.1) subject to appropriate initial conditions converges to the original time series:

$$x(t)=x(t_1),x(t_2),\ldots,\text{etc.,} \qquad (4.2.2)$$

if m in Eq. (4.2.1) is sufficiently large.

However, the function F, as well as the constants $\tau$ and m, are not specified by this theorem, and the most damaging limitation of the model of Eq. (4.2.1) is that the original time series must be stationary, since it represents an attractor. This means that for non-stationary time series the solution to Eq. (4.2.1) may not converge to Eq. (4.2.2) at all. Actually this limitation has deeper roots and is linked to the problem of stability of the model.

Prior to the development of Takens theorem, statisticians have developed a different approach to the problem in which they approximated a stochastic process by a linear autoregressive model:

$$x(t)=a_1 x(t-1)+a_2 x(t-2)+\ldots+a_n(t-n)+N, n\to\infty, \qquad (4.2.3)$$

where $a_i$ are constants, and N represents the contribution from noise.

A zero-mean purely non-deterministic stationary process x(t) possesses a linear representation as in Eq. (4.2.3) with $$\sum_{j=1}^{\infty} a_j^2 < \infty$$

(the condition of the stationarity).

On first sight, Eq. (4.2.3) is a particular case of Eq. (4.2.1) when F is replaced by a linear function and $\tau=1$. However, it actually has an important advantage over Eq. (4.2.1): It does not require stationarity of the time series Eq. (4.2.2). To be more precise, it requires certain transformations of Eq. (4.2.2) before the model can be applied. These transformations are supposed to "stationarize" the original time series. These types of transformations follow from the fact that the conditions of stationarity of the solution to Eq. (4.2.3) coincide with the conditions of its stability. In other words, the process is non-stationary when $$|G_1|\geq 1, \qquad (4.2.4)$$

where $G_1$ are the roots of the characteristic equation associated with Eq. (4.2.3).

The case $|G_1|\geq 1$ is usually excluded from considerations since it corresponds to an exponential instability, which is unrealistic in physical systems under observation. However, the case $|G_1|=1$ is realistic. Real and complex conjugates of $G_1$ incorporate trend and seasonal (periodic) components, respectively, into the time series Eq. (4.2.2).

By applying a difference operator:

$$\nabla x_t = x_t - x_{t-1} = (1-B)x_t \qquad (4.2.5)$$

where B is defined as the backward shift operator, as many times as required, one can eliminate the trend from the time series:

$$x_t, x_{t-1}, x_{t-2}, \ldots, \text{etc.} \qquad (4.2.6)$$

Similarly, the seasonal components from time series Eq. (4.2.6) can be eliminated by applying the seasonal difference operator:

$$\nabla_s x_t = (1-B^s)x_t = x_t - x_{t-s}. \qquad (4.2.7)$$

In most cases, the seasonal differencing Eq. (4.2.7) should be applied prior to standard differencing Eq. (4.2.5).

Unfortunately, it is not known in advance how many times the operators Eq. (4.2.5) or Eq. (4.2.7) should be applied to the original time series Eq. (4.2.6) for their stationarization. Moreover, in Eq. (4.2.7) the period S of the seasonal difference operator is also not prescribed. In the next section we will discuss possible ways to deal with these problems.

Assuming that the time series Eq. (4.2.6) is stationarized, one can apply to them the model of Eq. (4.2.1):

$$y(t)=F[y(t-1), y(t-2), \ldots, y(t-m)], \qquad (4.2.8)$$

where $$y_t, y_{t-1}, \ldots, \text{etc.}; \; (y_t = x_t - x_{t-1}) \qquad (4.2.9)$$

are transformed series Eq. (4.2.6), and $\tau=1$. After fitting the model of Eq. (4.2.8) to the time series Eq. (4.2.6), one can return to the old variable x(t) by exploiting the inverse operators $(1-B)^{-1}$ and $(1-B^S)^{-1}$. For instance, if the stationarization procedure is performed by the operator Eq. (4.2.5), then:

$$x(t)=x(t-1)+F\{[x(t-1)-x(t-2)],[x(t-2)-x(t-3),\ldots,\text{etc.}\}. \qquad (4.2.10)$$

Eq. (4.2.10) can be utilized for predictions of future values of Eq. (4.2.6), as well as for detection of structural and operational abnormalities. However, despite the fact that Eq. (4.2.8) and Eq. (4.2.10) may be significantly different, their structure is uniquely defined by the same function F. Therefore, structural abnormalities that cause changes of the function F can also be detected from Eq. (4.2.8) and consequently for that particular purpose the transition to Eq. (4.2.10) is not necessary.

It should be noted that application of the stationarization procedure Eq. (4.2.5) and Eq. (4.2.7) to the time series Eq. (4.2.6) is only justified if the underlying model is linear, since the stationarity criteria for nonlinear equations are more complex than for linear equations, in similar fashion to the stability criteria. Nevertheless, there are numerical evidences that even in nonlinear cases, the procedures Eq. (4.2.5) and Eq. (4.2.7) are useful in that they significantly reduce the error, i.e., the difference between the simulated and the recorded data, if the latter are non-stationary.

4.2.2 Model Fitting

The models Eq. (4.2.8) and Eq. (4.2.10) which have been selected in the previous section for detection of structural of abnormalities in the time series Eq. (4.2.6) have the following parameters to be found from Eq. (4.2.6): the function F, the time delay $\tau$, the order of time delays m, the powers $m_1$ and $m_2$ of the difference $(1-B)^{m_1}$ and the seasonal difference $(1-B^S)^{m_2}$, and the period s of the seasonal operator.

If the function F is linear, the simplest approach to model fitting is the Yule-Walker equations, which define the auto regressive parameters $a_i$ in Eq. (4.2.3) via the autocorrelations in Eq. (4.2.6). The auto regressive (AR) model has the form:

$$y(t) = \sum_{k=1}^{m} a_k y(t-k\tau) + w(t) \qquad (4.2.11)$$

where $w_i(t)$ is uncorrelated white noise, and the AR coefficients, $a_j$, can be determined by the Yule-Walker equations:

$$\rho_k = a_1\rho_{k-1} + a_2\rho_{k-2} + \ldots + a_k\rho_{k-m} \quad (4.2.12)$$

where $\rho_k$ is the autocorrelation function:

$$\rho_k = \frac{\sum_{t=-\infty}^{\infty}(y(kt)-\overline{\mu})(y(t+k\tau)-\overline{\mu})}{\sqrt{\sum_{t=-\infty}^{\infty}(y(t)-\overline{\mu})^2 \sum_{t=-\infty}^{\infty}(y(t+k\tau)-\overline{\mu})^2}} \quad (4.2.13)$$

and $\overline{\mu}$ is the time average of $y(t)$.

In many cases the assumption about linearity of the underlying dynamical system leads to poor model fitting. It is sometimes more practical to assume from the beginning that F is a nonlinear (and still unknown) function. In this case, the best tool for model fitting may be a feed-forward neural network that approximates the true extrapolation mapping by a function parameterized by the synaptic weights and thresholds of the network. It is known that any continuous function can be approximated by a feed-forward neural net with only one hidden layer. For this reason, in this work a feed-forward neural net with one hidden layer is selected for the model of Eq. (4.2.8) fitting. The model of Eq. (4.2.8) is sought in the following form:

$$y_i(t) = \sigma\left\{\sum_{j=1}^{} W_{i,j}\sigma\left[\sum_{k=1}^{m} w_{jk}y_i(t-k\tau)\right]\right\} \quad (4.2.14)$$

where $W_{1j}$ and $w_{jk}$ are constant synaptic weights, $\sigma(x) = \tan h(x)$ is the sigmoid function, and $y_i(t)$ is a function which is supposed to approximate the stationarized time series Eq. (4.2.9) transformed from the original time series.

The model fitting procedure is based upon minimization of the error measure:

$$E(W_{1j}, w_{jk}) = \frac{1}{2}\sum_{i}\left(y_i^*(t) - \sigma\left\{\sum_{j=1}^{} W_{ij}\sigma\left[\sum_{k=1}^{m} w_{jk}y_i(t-k\tau)\right]\right\}\right)^2 \quad (4.2.15)$$

where $y_i^*(t)$ are the values of the time series Eq. (4.2.9). The error measure Eq. (4.2.15) consists of two parts:

$$E = E_1 + E_2 \quad (4.2.16)$$

where $E_1$ represents the contribution of a physical noise, while $E_2$ results from non-optimal choice of the parameters of the model of Eq. (4.2.14).

There are two basic sources of random components $E_1$ in time series. The first source is chaotic instability of the underlying dynamical system. In principle, this component of $E_1$ is associated with instability of the underlying model, and it can be represented based upon the stabilization principle introduced by Zak, M, in a paper entitled "Postinstability Model in Dynamics," Int. J. of Theoretical Physics 1994, Vol. 33, No. 11. The second source is physical noise, imprecision of the measurements, human factors such as multi-choice decisions in economical or social systems or driving habits in case of the catalytic converter of a car, etc.

This second component of $E_1$ cannot be represented by any model based upon classical dynamics, including Eq. (4.2.8). However, there are models based upon a special type of dynamics (called terminal, or non-Lipschitz-dynamics) that can simulate this component. In the simplest case one can assume that $E_1$ represents a variance of a mean zero Gaussian noise.

The component $E_2$, in principle, can be eliminated by formal minimization of the error measure Eq. (4.2.15) with respect to the parameters $W_{1j}$, $w_{jk}$, $\tau$, m, $m_1$, $m_2$, and s.

Since there is an explicit analytical dependence between E and $W_{1j}$, $w_{jk}$, the first part of minimization can be performed by applying back-propagation. However, further minimization should include more sophisticated versions of gradient descent since the dependence $E(\tau, m, m_1, m_2, s)$ is too complex to be treated analytically.

4.2.3 Structural Abnormality Criterion

As noted in the introduction, there are two causes of abnormal behavior in the solution to Eq. (4.2.14):

1. Changes in external forces or initial conditions (these changes can be measured by Lyapunov stability and associated with operational abnormalities).
2. Changes in the parameters $a_j$, $W_{1j}$, and $w_{jk}$, i.e., changes in the structure of the function F in Eq. (4.2.8). These changes are measured by structural stability and associated with structural abnormalities. They can be linked to the theory of catastrophe.

In this section we introduce the following measure for structural abnormalities:

$$\zeta = \sum_{j=1}^{m}(a_j - \overset{o}{a}_j)^2 \quad (4.2.17)$$

where $$\overset{o}{a}_j$$

are the nominal, or "healthy" values of the parameters, and $a_j$ are their current values. Thus, if $$\zeta = 0, \text{ or } \zeta = |\epsilon| \quad (4.2.18)$$

where $\epsilon$ is sufficiently small, then there are no structural abnormalities. The advantage of this criterion is in its simplicity. It can be periodically updated, and therefore, the structural "health" of the process can be easily monitored.

The only limitation of this criterion is that it does not specify a particular cause of an abnormal behavior. Obviously, this limitation can be removed by monitoring each parameter $a_j$ separately.

4.2.4 Nominal Confidence Intervals

In the previous section, the state of the underlying dynamical system generating sensor data was defined by the dynamical invariants, $a_i$, $W_{1j}$, $w_{jk}$, i.e., auto-regressive coefficients and neural network weights. These invariants were calculated during a selected training period over N values of the original time series. We will associate this period with a short-term training. Obviously, during the period all the invariants $a_i$ are constants.

In order to introduce a long-term training period, we return to the original data:

$$x = x(t_i), i=0,1,\ldots etc \quad (4.2.19)$$

and consider them within the interval shifted forward by $\gamma$ points:

$x_1=x_1(t_i)$, $i=q, q+1, \ldots$ etc, $x_2=x_2(t_i)$, $i=2q, 2q+1, \ldots$ etc, $x_p=x_p(t_i)$, $i=pq, pq+1 \ldots$ etc, (4.2.20)

where p is the number of q-shifts.

For each series of data Eq. (4.2.20) one can compute the same invariants $a_i$ by applying the same sequence of algorithms as those applied to the original data Eq. (4.2.19). In general, even in case of absence of any abnormalities, the values for $a_i$ for different p are different because of measurement and computational errors, so that $a_i$ will occur as series of p:

$a_i=a_i(p)$, $p=1,2 \ldots p$. (4.2.21)

Figure 4:
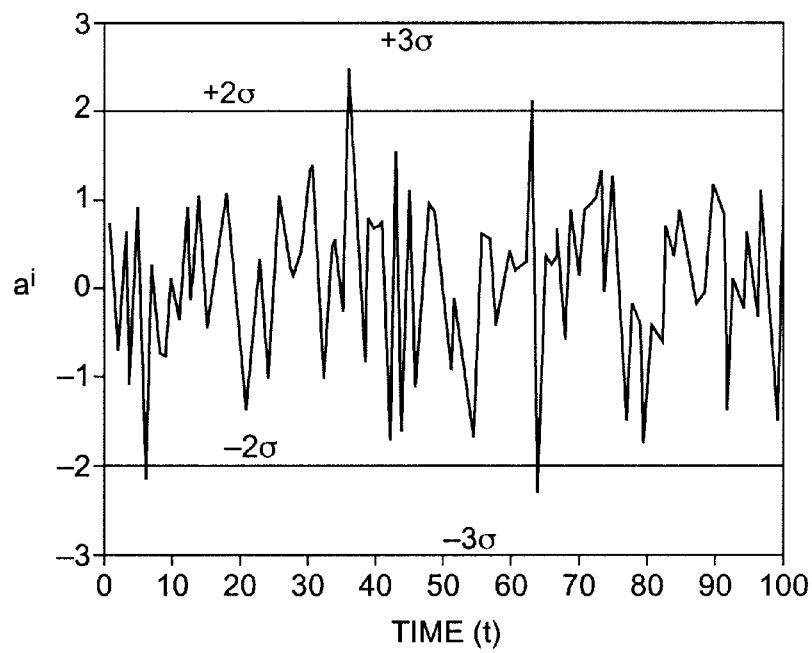
FIG. 4 shows a typical distribution of the auto regressive parameters $a_i$ of Eq. Eq. (4.2.3)

Since p is proportional to time:

$p \sim q\Delta t$, (4.2.22)

where $\Delta t$ is the sampling time interval, Eq. (4.2.21) actually represents another time series as shown in FIG. 4, and therefore, it can be treated in the same way as the original time series Eq. (4.2.19). However, such a treatment applied to each invariant as is very costly, and for most practical cases unnecessary. Indeed, since all gross nonstationarities (in the forum of the least-square polynomial trend and dominating harmonies) were already identified, it is very unlikely that the time series Eq. (4.2.21) contains any additional non-stationaries. Besides, since these invariants are associated with certain physical properties of the underlying dynamical system, their deviations from the original constant values can be interpreted as a result of errors in measurements and computations. Thus a simple statistical analysis of the time series Eq. (4.2.21) will be sufficient for defining the nominal confidence intervals.

In order to perform the statistical analysis for the time series Eq. (4.2.21), one could generate a histogram. However, in many practical cases, such a histogram may exhibit a non-Gaussian distribution, which makes it harder to define the confidence intervals. Hence it is more convenient to apply a "bootstrapping" approach as a preprocessing procedure in the following way:

1. Choose randomly P samples of data from Eq. (4.2.21) with the same sample size $n \sim p/2$:

$a_p^{(1)}=a_{p1}^{(1)}, a_{p2}^{(1)}, \ldots a_{pn}^{(1)}$, $a_p^{(p)}=a_1^{(p)}, \ldots a_{pn}^{(p)}$. (4.2.23)

2. Find the sample means:

$\tilde{a}_p^{(1)} = \frac{1}{n}\sum_{i=1}^{n} a_{pi}^{(1)}$, (4.2.24)

$\ldots$, $\tilde{a}_p^{(p)} = \frac{1}{n}\sum_{i=1}^{n} a_{pi}^{(p)}$.

The bootstrapping procedure guarantees that the distribution of the means $\tilde{a}_p^{(i)}$ will be Gaussian even if the original distribution was non-Gaussian, and simple Gaussian nominal confidence intervals can be constructed. As an example, nominal confidence intervals which include ~68%, ~95% and ~99.73% of all the sample means, $\tilde{a}_p^{(i)}$, are:

$\mu_a - \frac{\sigma_a}{\sqrt{n}} < \tilde{a}_p^{(i)} < \mu_a + \frac{\sigma_a}{\sqrt{n}}$ (4.2.25)

$\mu_a - 2\frac{\sigma_a}{\sqrt{n}} < \tilde{a}_p^{(i)} < \mu_a + 2\frac{\sigma_a}{\sqrt{n}}$, and (4.2.26)

$\mu_a - 3\frac{\sigma_a}{\sqrt{n}} < \tilde{a}_p^{(i)} < \mu_a + 3\frac{\sigma_a}{\sqrt{n}}$ (4.2.27)

respectively, where $\mu_a$ and $\sigma_a$ are the mean and standard deviation of the sample's mean distribution.

4.2.5 Implementation Architecture

Figure 5:
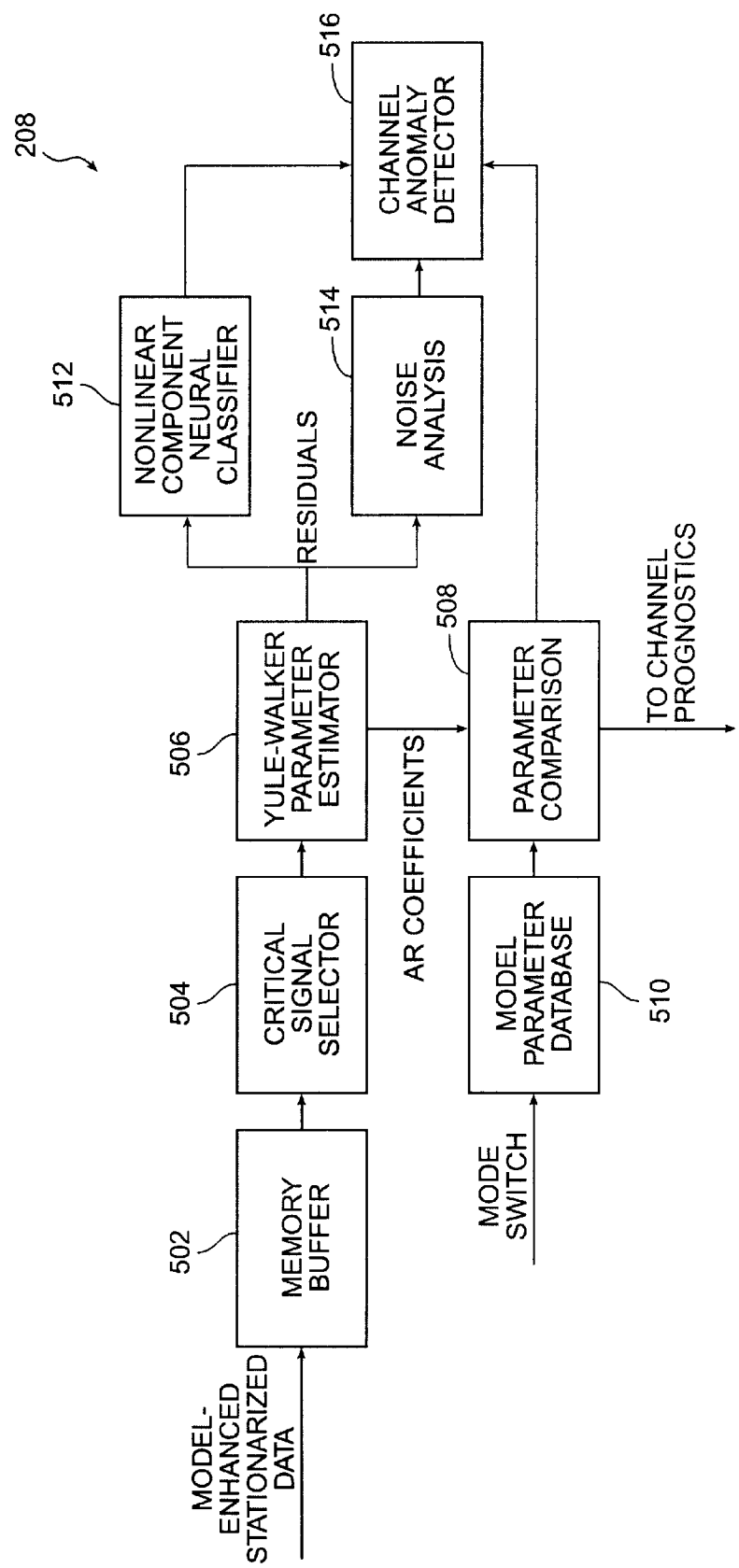
FIG. 5 is a high level block diagram illustrating an example of the dynamical anomaly detector illustrated in FIG. 2.

The implementation architecture of the Dynamical Invariant Anomaly Detector is shown in FIG. 5.

After the sensor data are stationarized, they are fed into the Memory Buffer 502, which keeps a time history of the sensor data for analysis as requested by the Critical Signal Selector 504. The Critical Signal Selector will then pass the relevant sensor data to the Yule-Walker Parameter Estimator 506. There, the dynamical invariants $a_i$ and the AR coefficients of the time-delay equation are computed using Yule-Walker method as shown in Eq. (4.2.12). The Critical Signal Selector module is used where the system is processing resources are limited so that processing of all available signals is untenable. For such applications, the critical signals are a combination of: (1) key signals identified during the design phase, especially those that have low redundancy; and (2) signals implicated by the other components, namely bad signals from the Coherence-based detector 206 and signals key to the present operating mode as sensed by the Symbolic Data Model 204.

Once the coefficients are computed within the Yule-Walker Parameter Estimator, they will be compared to the ones stored in the Model Parameter Database 510. This contains a set of nominal time-delay equation coefficients appropriate for particular operating mode. A statistical comparison 508 will be made between the stored and just-computed AR coefficients using the bootstrapping method as outlined in section 4.2.4, and if a discrepancy is detected, the identity of the offending sensor will be sent to the Channel Anomaly Detector 516.

Further analysis is carried out on the residual or the difference between the sensor data values and the model predicted values, i.e. the uncorrelated noise, by the Nonlinear Component Neural Classifier 512 and Noise Analysis 514 modules. The Nonlinear Component Neural Classifier is designed to extract the nonlinear components, which may be missed by the linear Yule-Walker Parameter Estimator. The weights of the artificial neural network (Eq. 4.2.14), another set of dynamical invariants, will be computed and compared with nominal weights stored in the Model Parameter Database. Similarly, the noise characteristics, such as the moments of probability distribution, are dynamic invariants for stationarized sensor data, and will be compared with those stored in the Model Parameter Database 510. If any anomalies are detected in either the nonlinear components or the noise, the identity of the sensor will be sent to the Channel Anomaly Detector.

Finally, the Channel Anomaly Detector 516 will aggregate information from the Yule-Walker Parameter Estimator, Nonlinear Component Neural Classifier, and Noise Analysis modules, and classify the anomaly before sending the fault information to the Predictive Comparison module, which is discussed in section 4.4 below. The classification is kind of a checklist. In other words, the Dynamical Invariant Anomaly Detector 208 effective asks a series of questions—Do we see a glitch in the linear component (yes/no)? Do we see a glitch in the nonlinear component? Do we see a glitch in the noise? If the answer to all of these is no, there is no fault or the fault is a feedback effect caused by a different signal. If the answer to the noise question is yes but others are no, the fault is caused by a degradation in the sensor, and so on.

4.3 Model Filter—Gray Box Method of Sensor Data Analysis

While the model filter component 202 occurs first in the data flow shown in FIG. 2, it was more useful to consider it after having first discussed the Dynamical Invariant Detector 208 described above in section 4.2. The Dynamical Invariant Anomaly Detector represents a "Black Box" strategy, where nothing is known about the internal governing equations of a system. On the other hand, as will be explained below, the model filter represents a "Gray Box" because there is only a partial understanding of the process(es) being modeled; i.e., we only have a partial physical model of the process in question.

Such a linear approach is effective and general, but there are profound benefits to simultaneous consideration of sensor and physical information, as we will explore in this section. We will make frequent reference to section 4.2.

Sensor data is one of the most reliable sources of information concerning the state and operational performance of the underlying system. When this data is presented in the form of a time series, two important results can be obtained: prediction of future time series values from current and past values, and detection of abnormal behavior of the underlying system. In most existing methodologies, a solution to the second problem is based upon the solution to the first one: abnormal behavior is detected by analysis of the difference between the recorded and the predicted values of the time series. Such analysis is usually based upon comparison of certain patterns, such as the average value, the average slope, the average noise level, the period and phase of oscillations, and the frequency spectrum. Although all of these characteristics may have physical meaning and carry information, they can change sharply in time when a time series describes the evolution of a dynamical system, such as the power system of a spacecraft or the solar pressure. Indeed, in the last case, a time series does not transmit any "man-made" message, and so it may have different dynamical invariants. In other words, it is reasonable to assume that when a time series is describing the evolution of a dynamical system, its invariants can be represented by the coefficients of the differential (or the time-delay) equation which simulates the dynamical process. Based upon this idea, we have developed the following strategy for detection of abnormalities: a) build a dynamical model that simulates a given time series, and then b) develop dynamical invariants whose change manifests structural abnormalities.

It should be noted that there are two types of abnormal behavior of dynamical systems, namely operational and structural. Operational abnormalities can be caused by unexpected changes in initial conditions or in external forces, but the dynamical model itself, in this case, remains the same. In mathematical terms, operational abnormalities are described by changes in non-stationary components of the time series.

It is important to emphasize that operational and structural abnormalities can occur independently, i.e. operational abnormalities may not change the parameters of the structure invariants, and vice-versa.

4.3.1 Gray Box Approach

Further examples and clarifying details of this aspect of the invention can be found in Appendix B attached herewith.

As discussed, the methodology described in section 4.2 can be termed a black-box approach since it does not require any preliminary knowledge about the source of the sensor data. Such an approach can be justified for developing dynamical models of systems whose behavior can be identified only from their output signals. However, to fully assess system health, the diagnostic system must have comprehensive ability to sense not failures, but impending failures, and operational difficulties. While fixed thresholds, i.e., traditional redlines, may be sufficient for simple steady-state systems, more sophisticated diagnosis techniques are needed for unsteady operations and detection of incipient faults.

The natural starting point for a more sophisticated diagnosis is the model of the system. Fortunately, many systems, such as aircraft, spacecraft, gas turbine engines, hydraulic systems, etc., usually have well-developed dynamic models. The most straightforward application of the model for diagnosis is to compare the observed sensor readings to those predicted by a model. If the difference between the observed and the predicted values, i.e., residual, is greater than some set threshold value, an anomaly has occurred. In practice, however, it is not straightforward to compare the observed and predicted values because the quality of the model may vary and noise may be present. If the model is inaccurate or has insufficient detail, the predicted values may differ greatly from those of the actual system. Some deviations are unavoidable since there is no theoretical description for the phenomenon. For example, secondary effects such as friction, thermal effects, sensor noise, etc., may not have simple model descriptions. In other cases, the model can be purposely coarse, i.e., has insufficient detail, to facilitate real-time computations.

In an effort to mitigate the problem of comparing observed and predicted values, many different approaches have been developed to generate robust residuals and/or thresholds for anomalies. These methods include adaptive threshold methods, observer-based approaches, parity relation methods, parameter estimation methods, and statistical testing methods.

In adaptive threshold methods, the threshold on the difference between the observed and predicted value is varied continuously as function of time. The method is passive in the sense that no effort is made to design a robust residual. The UIO (unknown input observer) and parity relation methods are active since the residual is made to be robust to known disturbances and modeling errors. The residual is sensitive to only unknown disturbances that are likely to be anomalies or faults in the system. The drawback of these methods is that the structure of the input disturbances and modeling error must be known. In addition, the methods are applicable to mostly linear systems. The parameter estimation methods use system identification technique to identify changes in the model parameters of the dynamical system. The advantage of this method is that the implementation is straightforward, and it can deal with non-linear systems. The disadvantage is that a large amount of computational power may be required to estimate all of the parameters in the model. Finally, statistical testing methods use statistical techniques such as weighted sum-squared residual (WSSR), $x^2$ testing, sequential probability ratio testing (SPRT), generalized likelihood ratio (GLR), etc., to differentiate between normal noise and anomalous sensor values. The disadvantage of this method is that the residual is assumed to be a zero-mean white noise process with known covariance matrix. The residual in many cases may not be describable in this manner.

In effort to improve model-based fault diagnosis, we propose a new approach called the gray-box method. It is called a "gray-box" because it incorporates both a "black-box," i.e., stochastic model and a "white-box," i.e., deterministic model. It is a hybrid model incorporating elements from residual based methods and parametric estimation methods. It is similar to an adaptive threshold methods in that a residual is generated without any regard for robust residual generation. However, instead examining the amplitude of the residual as in the case of the adaptive threshold methods, the structure, i.e. model parameters, of the residual is examined. The residual generation is our "white-box." The residual is modeled using techniques similar to the parametric estimation methods. The method is distinct from standard parametric estimation method in that the system identification is carried out on the residual, not the system variables directly. The residual is parameterized, not the full system. In our terminology, the parameter estimation method is a "black-box."

Figure 7A:
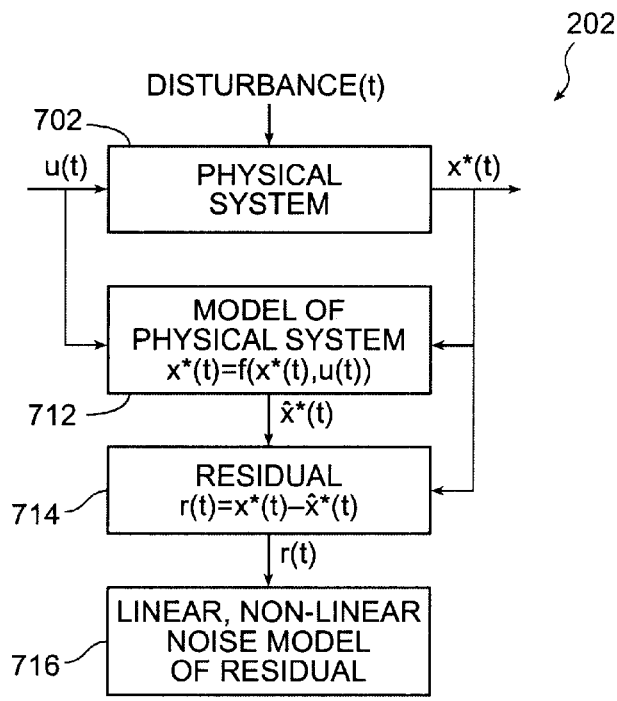
FIGS. 7A and 7B are high level block diagrams illustrating an example of the model filter component shown in FIG. 2.

A high-level generalized block diagram of the gray-box method for the model filter 202 (FIG. 2) is shown in FIG. 7A. The physical system is represented by box 702. After filtering the deterministic components using the model of the system, the residual is separated into its linear, non-linear, and noise components and is fitted to stochastic models. The parameters to the linear, non-linear, and noise models 716 completely describe the residual. The gray-box has several advantages. First, the full model is employed rather than only the model structure as in the case of standard parametric estimation methods. Thus the gray-box takes full advantage of the information about the system. Second, the gray-box method can be made robust to modeling errors which can be taken care of during residual modeling. The model of the residual can also describe many unmodeled phenomena in the original model. Finally, the method is applicable to both linear and non-linear systems.

4.3.1.1 Residual Generation

Any theoretical dynamical model includes two types of components: those directly describing the phenomena associated with the primary function of the system (such as the effect of torque exerted on a turbine shaft on rotor speed), and those representing secondary effects (such as frictional losses, heat losses, etc.). The first type of components is usually well understood and possesses a deterministic analytical structure, and therefore its behavior is fully predictable. On the other hand, the second type may be understood only at a much more complex level of description (including molecular level) and cannot be simply incorporated into a theoretical model. In fact, some components may be poorly understood and lack any analytical description, e.g. viscosity of water in microgravity. Thus, in accordance with the present invention, we filter out contributions that are theoretically predictable from the sensor data (i.e., the components of the first type), and focus on the components of the second type whose theoretical prediction is lacking. As will be seen, the filtering will be performed by the theoretical model itself.

The residual generation is as follows. Let us assume that the theoretical model is represented by a system of differential equations:

$$\dot{x}(t)=f(x(t),u(t))+y(t), \quad (4.3.1)$$

where x(t) is the state variable vector, u(t) is the known input, and f is the known theoretical relationship following from conservation laws of mechanics, thermodynamics, etc. The last term, y(t), represent components which lack theoretical descriptions, are too complex, or are the result of modeling errors. These can include sensor noise, unknown input to the system, friction in bearings, material viscosity, and other secondary effects such as torsional oscillations of the shaft, flutter in the turbine and compressor blades, incomplete fuel combustion, etc.

The estimate of the system is accomplished by substituting the observed sensor data for the evolution of the state variables, x*(t), and input, u(t). Hence:

$$\dot{x}^*(t)=f(x^*(t),u(t)). \quad (4.3.2)$$

The residual, $$r(t)=\hat{x}(t)-\dot{x}(t), \quad (4.3.3)$$

is generated by subtracting the solution of Eq. (4.3.2), $\hat{x}^*(t)$, which is generated by using the observed state variables, x*(t), from the solution of Eq. (4.3.1). Hence the original theoretical model is the filter.

In general, the residual can be treated as another realization of some stochastic process. If the theoretical model of Eq. (4.3.1) is accurate, accounts for most physical effects, and the observed state variables are accurate, then the residual, |r(t)|, will be very small, i.e., $$|r(t)|<<|\dot{x}^*(t)|, \quad (4.3.4)$$

and either a fixed or an adaptive threshold can be assigned as criteria for anomalous behavior. If the system is linear, and the structure of y(t) is known, a more sophisticated UIO (unknown input observer) filter can be constructed to make the residual more robust modeling errors and disturbances. However, in our gray-box approach, the simple form of Eq. (4.3.3) is preferred over the more robust residuals since the residual is to be modeled. If the residual is too robust, the characteristic structure of y(t) will become hidden.

Figure 6:
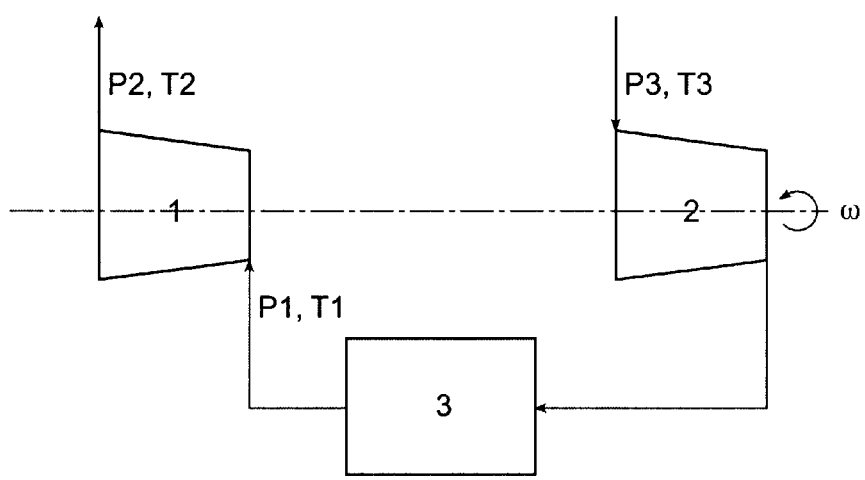
FIG. 6 shows a schematic of simple gas turbine as an example illustrating the present invention.

Merely as an example to illustrate the foregoing, consider the simplest gas turbine plant consisting of a turbine 1, a compressor 2, and a combustion chamber 3, as shown in FIG. 6. Ignoring the thermal inertia of the combustion camber, one can write the following dynamic equation for the angular velocity, ω, of the shaft.

$$J\frac{\partial \omega}{\partial t} = M_1(\omega, \mu) - M_2(\omega) - M_r(t) \quad (4.3.5)$$

where J is the moment of inertia of the turbo-compressor (1-2) in the axis of rotation, $M_1$ is the turning moment generated by the turbine, $M_2$ is the resistive moment applied by the compressor, bearings, etc., on the shaft, μ is the rate of fuel burned inside the combustion camber, and $M_r(t)$ is the random moment applied by effects such as torsional vibration of the shaft, blade flutter in the compressor and turbine, propagation of pressure pulses along the pipelines, heat loss, seal leaks, etc.

The conditions for stability of the solutions of Eq. (4.3.5) are:

$$\frac{\partial M_1}{\partial \omega} < 0, \frac{\partial M_2}{\partial \omega} > 0; \text{i.e.,} \frac{\partial}{\partial \omega}(M_1 - M_2) < 0. \quad (4.3.6)$$

Consequently, if one linearizes Eq. (4.3.5) with respect to a stationary regime where the rate of fuel burn is constant, i.e., $$\mu=\mu_o=const. \quad (4.3.7)$$

Eq. (4.3.5) can be reduced to the form:

$$\dot{\omega} = -\gamma\omega + \Gamma(t), \quad (4.3.8)$$

where $$\gamma = \frac{1}{J}\left[\frac{\partial M_1(\omega,\mu)}{\partial \omega} - \frac{\partial M_2(\omega)}{\partial \omega}\right]_{\mu=\mu_0} > 0, \text{ and} \quad (4.3.9)$$

$$\Gamma(t) = \frac{M_r(t)}{J}. \quad (4.3.10)$$

Γ(t) represents a stochastic force, and Eq. (4.3.8) is a Langevin equation whose formal solution is:

$$\omega(t) = \omega_0 e^{-\gamma t} + \int_0^t e^{-\gamma(t-t')}\Gamma(t')dt' \quad (4.3.11)$$

subject to the initial condition:

$$\omega = \omega_o \text{ at } t=0. \quad (4.3.12)$$

This solution is the only information that can be obtained from the sensor data. The first term in Eq. (4.3.11) is fully deterministic and represents all of the theoretical knowledge about the plant. The second term includes the stochastic force (Eq. 4.3.10) and is stochastic. Hence, the stochastic process described by Eq. (4.3.11) represents only a part of the sensor data.

Using a black box approach, a complex preprocessing procedure is required to extract the stochastic force Γ(t) from the sensor data which is the solution of Eq. (4.3.112). However, the proposed gray box approach eliminates this preprocessing. Substituting the sensor data Eq. (4.3.11) into the theoretical model of Eq. (4.3.8), the original stochastic force is immediately exposed as the inverse solution:

$$\Gamma(t) = \dot{\omega}^* + \gamma\omega^*, \quad (4.3.13)$$

where ω* is the sensor data.

Eq. (4.3.11) shows that the more stable the model, i.e., the larger the value of $\mu$, the less the stochastic force Γ(t), contributes to the sensor data, since:

$$0 < e^{-r(t-t')} < 1 \text{ at } t > t' \quad (4.3.14)$$

In other words, for highly stable dynamical models, the black box approach is not only more laborious, but is also less effective since the stochastic forces become deeply hidden in the sensor data. For the gray box approach, on the other hand, the theoretical model acts as a filter, which damps the deterministic components and amplifies the stochastic components. It is noted that Eq. (4.3.13) represents only one sample of the sought stochastic force, Γ*(t). A black box approach still needs to be applied to Γ*(t) in order to reconstruct all of its stochastic properties.

4.3.1.2 Residual Modeling

For the model of the residual, we start with a traditional description of sensor data given in the form of a time series which describes the evolution of an underlying dynamical system. It will be assumed that this time series can not be approximated by a simple analytical expression and is not periodic. In another words, for an observer, the future values of the time series are not fully correlated with the past ones, and therefore, they are apprehended as random. Such time series can be considered as a realization of an underlying stochastic process which can be described only in terms of probability distributions. However, any information about this distribution can not be obtained from a simple realization of a stochastic process unless this process is stationary. Then the ensemble average can be replaced by the time average. An assumption about the stationarity of the underlying stochastic process would exclude from consideration such important components of the dynamical process as linear and polynomial trends, or harmonic oscillations. Thus a method is needed to deal with non-stationary processes.

Our approach to building a dynamical model of the residual is based upon progress in three independent fields: nonlinear dynamics, theory of stochastic processes, and artificial neural networks. From the field of nonlinear dynamics, based upon the Takens theorem, any dynamical system which converges to an attractor of a lower (than original) dimensionality can be simulated with a prescribed accuracy by the time-delay equation:

$$x(t) = F(x(t-\tau), x(t-2\tau), \ldots, x(t-m\tau)), \quad (4.3.15)$$

where x(t) is a given time series, such as a variable in the residual vector, r(t), and τ is the constant is the time delay.

It has been shown that the solution to Eq. (4.3.15), subject to appropriate initial conditions, converges to the original time series:

$$x(t) = x(t_1), x(t_2), \ldots, \quad (4.3.16)$$

if m in Eq. (4.3.15) is sufficiently large.

However, the function F, as well as the constant τ and m, are not specified by this theorem, and the most "damaging" limitation of the model of Eq. (4.3.15) is that the original time series must be stationary since it represents an attractor. This means that for non-stationary time series the solution to Eq. (4.3.15) may not converge to Eq. (4.3.16) at all. Actually this limitation has deeper roots and is linked to the problem of stability of the model of Eq. (4.3.15).

A discrete-time stochastic process can be approximated by a linear autoregressive model:

$$x(t) = a_1 x(t-1) + a_2 x(t-2) + \ldots a_n(t-n) + z(t) \text{ an } n \to \infty, \quad (4.3.17)$$

where $a_i$ are constants, and z(t) represents the contribution from white noise.

It can be shown that any zero-mean purely non-deterministic stationary process x(t) possesses a linear representation as in Eq. (4.3.17) with $$\sum_{j=1}^{\infty} a_j^2 < \infty;$$

i.e., the condition of the stationarity.

In order to apply Eq. (4.3.17), the time series Eq. (4.3.16) must be decomposed into its stationary and non-stationary components. To "stationarize" the original time series, certain transformations of Eq. (4.3.16) are required. These types of transformations follow from the fact that the conditions of stationarity of the solution to Eq. (4.3.17) coincide with the conditions of its stability, i.e., the process is non-stationary when $$|G_1| \geq 1, \quad (4.3.18)$$

where $G_1$ are the roots of the characteristic equation associated with Eq. (4.3.17).

The case $|G_1| \geq 1$ is usually excluded from considerations since it corresponds to an exponential instability which is unrealistic in physical systems under observation. However, the case $|G_1|=1$ is realistic. Real and complex conjugates of $G_1$ incorporate trend and seasonal (periodic) components, respectively, into the time series Eq. (4.3.16).

By applying a difference operator:

$$\nabla x(t)=x(t)-x(t-1)=(1-B)x(t), \quad (4.3.19)$$

where B is defined as the backward shift operator, as many times as required, one can eliminate the trend from the time series:

$$x(t),x(t-1),x(t-2),\ldots, \quad (4.3.20)$$

Similarly, the seasonal components from the time series Eq. (4.3.20) can be eliminated by applying the seasonal difference operator:

$$\nabla_s x(t)=(1-B^s)x(t)=x(t)-x(t-s). \quad (4.3.21)$$

In most cases, the seasonal differencing Eq. (4.3.21) should be applied prior to the standard differencing Eq. (4.3.19).

Unfortunately, it is not known in advance how many times the operators Eq. (4.3.19) or Eq. (4.3.21) should be applied to the original time series Eq. (4.3.20) for their stationarization. Moreover, in Eq. (4.3.21) the period s of the seasonal difference operator is also not prescribed. However, several methods are known to estimate the order of differentiation. One simple estimate of the number of operations for Eq. (4.3.20) is minimizing the area under the autocorrelation curve.

Once the time series Eq. (4.3.20) is stationarized, one can apply to them the model of Eq. (4.3.15):

$$y(t)=F(y(t-1),y(t-2),\ldots,y(t-m)), \quad (4.3.22)$$

where $$y(t),y(t-1),\ldots;(y(t)=x(t)-x(t-1)) \quad (4.3.23)$$

are transformed series Eq. (4.3.20), and $\tau=1$. After fitting the model of Eq. (4.3.22) to the time series Eq. (4.3.20), one can return to the old variable x(t) by exploiting the inverse operators $(1-B)^{-1}$ and $(1-B^s)^{-1}$. For instance, if the stationarization procedure is performed by the operator Eq. (4.3.19), then:

$$x(t)=x(t-1)+F([x(t-1)-x(t-2)],[x(t-2)-x(t-3)],\ldots). \quad (4.3.24)$$

Eq. (4.3.24) can be utilized for modeling the residual, predictions of future values of Eq. (4.3.20), as well as for detection's of structural abnormalities. However, despite the fact that Eqs. Eq. (4.3.22) and Eq. (4.3.24) may be significantly different, their structure is uniquely defined by the same function F. Therefore, structural abnormalities which cause changes of the function F, can also be detected from Eq. (4.3.22) and consequently for that particular purpose the transition to Eq. (4.3.24) is not necessary.

It should be noted that strictly speaking, the application of the stationarization procedure Eq. (4.3.19) and Eq. (4.3.21) to the time series Eq. (4.3.20) are justified only if the underlying model is linear since the criteria of stationarity for nonlinear equations are more complex than for linear ones in the same way as the criteria of stability are. Nevertheless, there are numerical evidences that even in nonlinear cases, the procedures Eq. (4.3.19) and Eq. (4.3.21) are useful in a sense that they significantly reduce the error, i.e., the difference between the simulated and the recorded data if the latter are non-stationary.

4.3.1.3 Model Fitting

The models Eq. (4.3.22) and Eq. (4.3.24) which have been selected in the previous section for detection of structural of abnormalities in the time series Eq. (4.3.20), have the following parameters to be found from Eq. (4.3.20): the function, F, the time delay, $\tau$, the order of time delays, m, the powers, $m_1$, and $m_2$, of the difference $(1-B)^{m_1}$ and the seasonal difference $(1-B^s)^{m_2}$, and the period s of the seasonal operator.

Figure 7B:
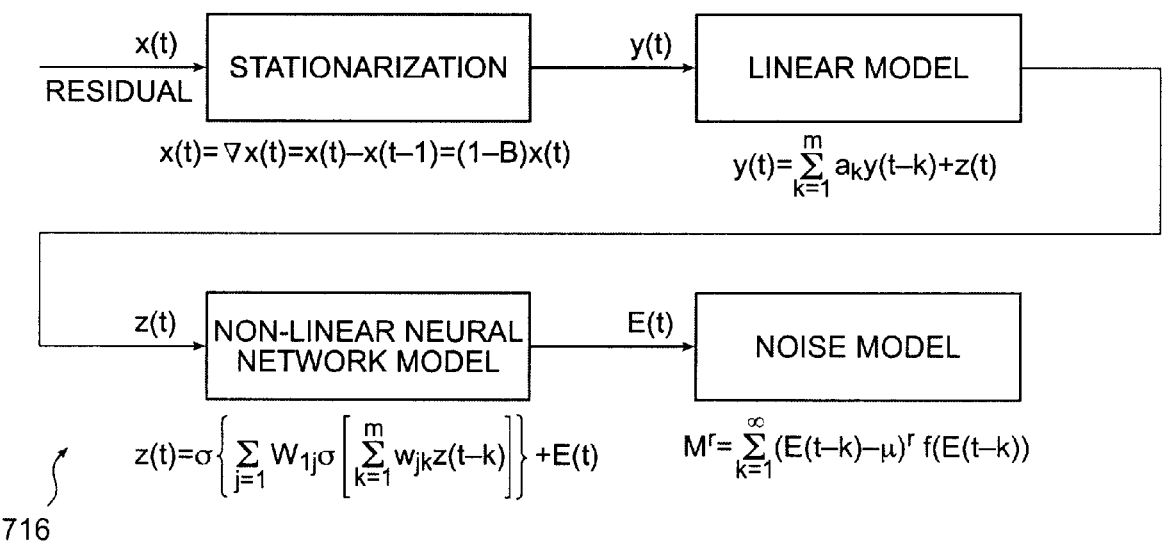

The form of the function F we've selected for the residual is shown in FIG. 7B. After stationarization, the linear component is fit using the Yule-Walker Equations which define the auto regressive parameters $a_i$ in Eq. (4.3.17) via the autocorrelations in Eq. (4.3.20). If sufficient, the residual left after removal of the linear component, w(t), can be directly analyzed and modeled as noise.

If the linear model of the residual leads to poor model fitting, the best tool for fitting the non-linear component of the residual may be a feed-forward neural network which approximates the true extrapolation mapping by a function parameterized by the synaptic weights and thresholds of the network. It is known that any continuous function can be approximated by a feed-forward neural net with only one hidden layer, and thus is selected for fitting the non-linear component after the linear component is removed using equation Eq. (4.3.17). Hence w(t) is sought in the following standard form of time-delay feed-forward network:

$$z(t) = \sigma\left\{\sum_{j=1} W_{1j}\sigma\left[\sum_{k=1}^{m} w_{jk}z(t-k\tau)\right]\right\}, \quad (4.3.25)$$

where $W_{1j}$ and $w_{jk}$ are constant synaptic weights, $\sigma(x)=\tanh(x)$ is the sigmoid function.

The model fitting procedure is based upon minimization of the mean standard error:

$$E(W_{1j}, w_{jk}) = \quad (4.3.26)$$

$$\sum_i \left(z(t-i) - \sigma\left\{\sum_{j=1} W_{1j}\sigma\left[\sum_{k=1}^{m} w_{jk}z(t-k\tau-i)\right]\right\}\right)^2,$$

The error measure Eq. (4.3.26) consists of two parts:

$$E=E_1+E_2, \quad (4.3.27)$$

where $E_1$ represents the contribution of a physical noise, while $E_2$ results from non-optimal choice of the parameters of the model of Eq. (4.3.25).

There are two basic sources of random components $E_1$ in time series. The first source is chaotic instability of the underlying dynamical system; in principle, this component of $E_1$ is associated with instability of the underlying model, and it can be represented based upon known and understood stabilization principles. The second source is physical noise, imprecision of the measurements, or human factor such as multi-choice decisions in economical or social systems, or the driving habits in case of the catalytic converter of a car, etc.

The last component of $E_1$ cannot be presented by any model based upon classical dynamics, including Eq. (4.3.22). However, there are models based upon a special type of dynamics called terminal, or non-Lipschitz-dynamics, which can simulate this component. In the simplest case one can assume that $E_1$ represents a variance of a mean zero Gaussian noise.

The component $E_2$, in principle, can be eliminated by formal minimization of the error measure Eq. (4.3.26) with respect to the parameters $W_{1j}$, $w_{jk}$, $\tau$, m, $m_1$, $m_2$, and s.

Since there is an explicit analytical dependence between E and $W_{1j}$, $w_{jk}$, the first part of minimization can be performed by applying back-propagation. However, further minimization should include more sophisticated versions of gradient descent since the dependence $E(\tau, m, m_1, m_2, s)$ is too complex to be treated analytically.

4.3.1.4 Anomaly Detection

As discussed in the previous section, there are two causes for abnormal behavior in the solution to Eq. (4.3.25): 1) Changes in external forces or initial conditions (these changes can be measured by Lyapunov stability and associated with operational abnormalities). 2) Changes in the parameters $W_{1j}$, $w_{jk}$, i.e., changes in the structure of the function F in Eq. (4.3.22). (These changes are measured by structural stability and associated with structural abnormalities. They can be linked to the theory of catastrophe).

The measure we use for anomaly detection in the non-linear component is:

$$\zeta = \sum \left[ \left(W_{1j} - \overset{o}{W}_{1j}\right)^2 + \left(w_{ij} - \overset{o}{w}_{ij}\right)^2 \right]. \quad (4.3.28)$$

where $\overset{o}{W}_{1j}$ and $\overset{o}{w}_{jk}$, are the nominal, or "healthy" values of the parameters, and $W_{1j}$, $w_{jk}$, are their current values. If $$\zeta = |\epsilon|, \quad (4.3.29)$$

where $\epsilon$ is sufficiently small, then there is no structural abnormalities. The advantage of this criterion is in its simplicity. It can be periodically updated, and therefore, the structural "health" of the process can be easily monitored.

Similar criteria can be generated for the parameters of the linear component, $a_j$, and the noise component which is modeled by the variance or higher moments. Unfortunately, there is no general method for setting the threshold, $\epsilon$, other than experience and heuristic methods. This is a problem faced by all fault diagnosis.

4.4 Predictive Thresholds (Prognostic Assessment)

Figure 10:
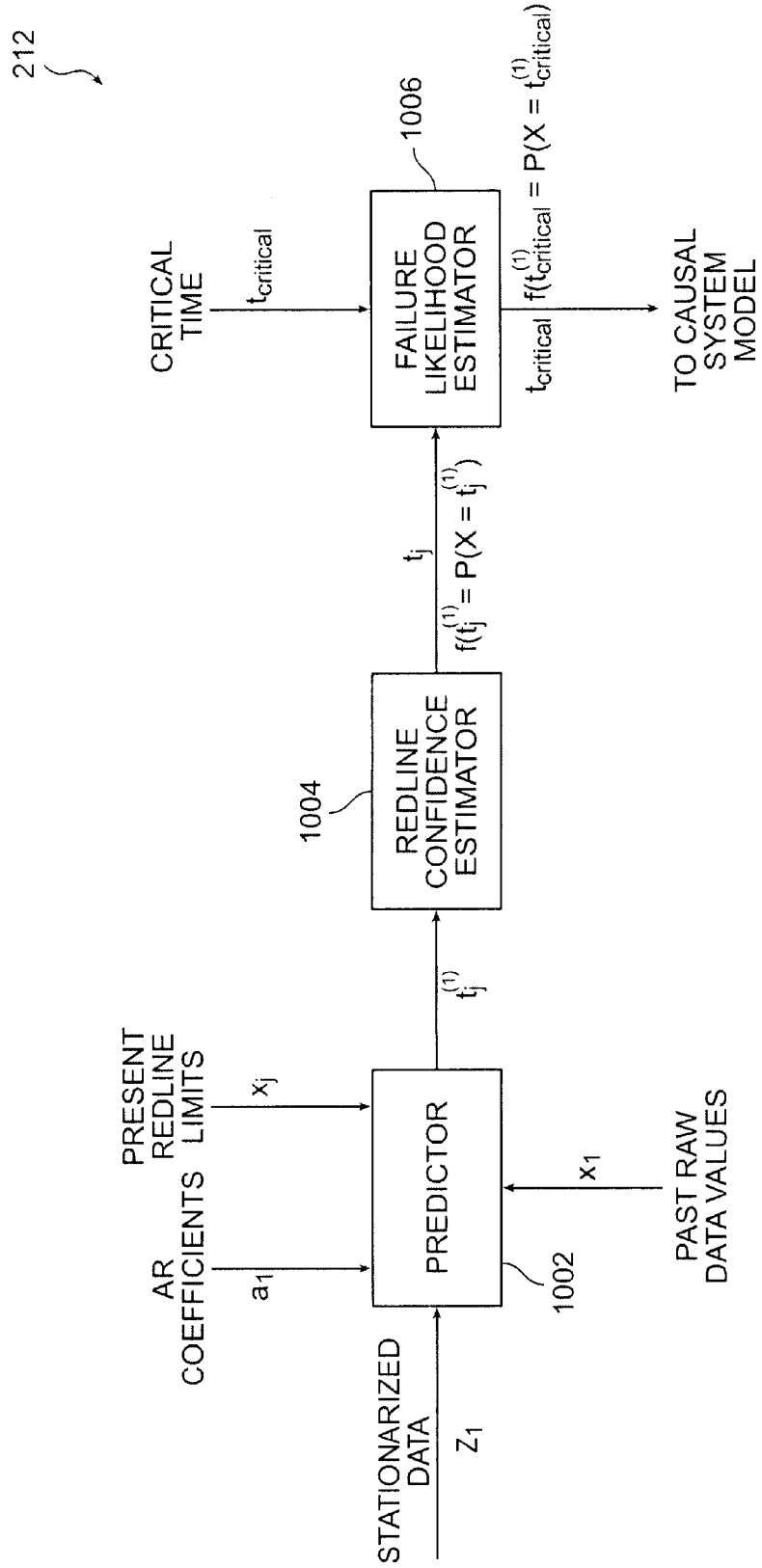
FIG. 10 is a high level block diagram illustrating an example of an embodiment of the prognostic assessment module shown in FIG. 2.

Referring now to FIG. 10, the prognostic assessment component 212 shown in FIG. 2 comprises a channel level prognostics algorithm. It is intended to identify trends which may lead sensor data values to exceed limit values, such as redlines. A stochastic model such as the auto-regressive model is used to predict values based upon previous values, i.e., forecasting. The aim is to predict, with some nominal confidence, if and when the sensor values will exceed its critical limit value. This permits warning of an impending problem prior to failure.

4.4.1 Forecasting Time Series

Figure 8:
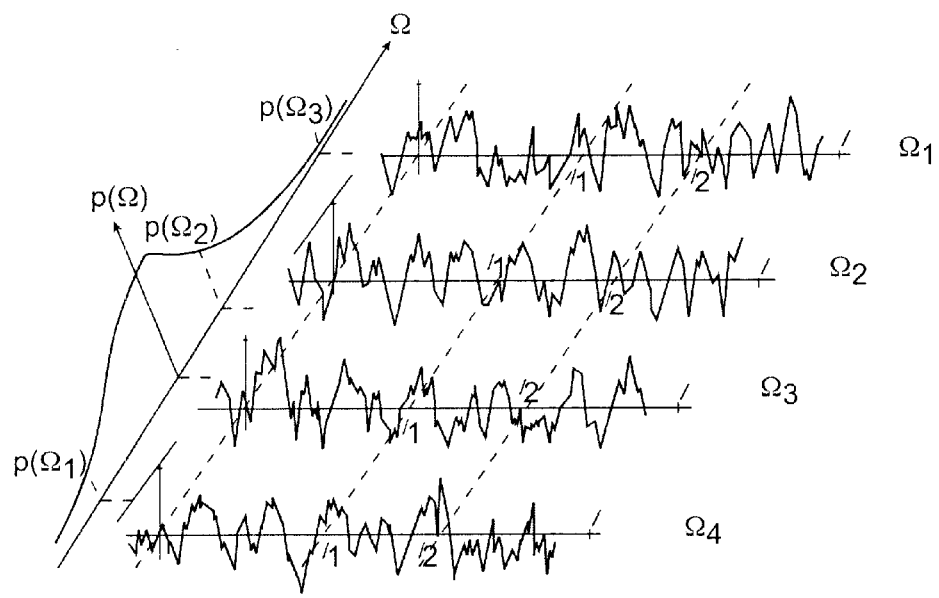
FIG. 8 illustrates an example of ensemble of possible time series.
Figure 9:
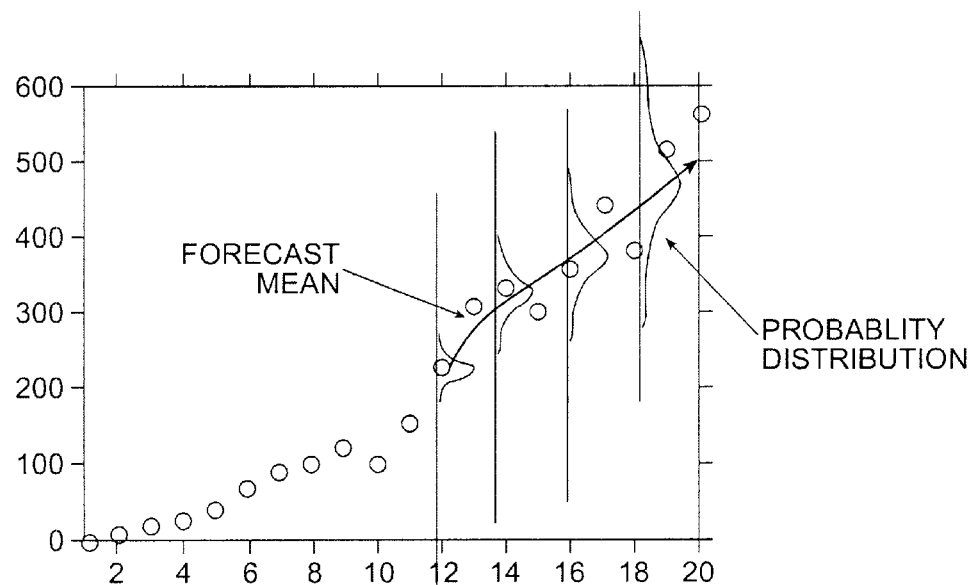
FIG. 9 illustrates an example of a time series forecast in the form of a predicted mean and probability distribution produced by averaging the time series ensemble of FIG. 8.

In general, time-series forecasting is not a deterministic procedure. It would be deterministic only if a given time series is described by an analytical function, in which case the infinite lead time prediction is deterministic and unique based upon values of the function and all its time derivatives at t=0. In most sensor data, this situation is unrealistic due to incomplete description by the analytic model, sensor noise, etc. In fact, the values of a time series may be uncorrelated with the previous ones, and an element of randomness is introduced into the forecast. Such randomness is incorporated into the underlying dynamical model by considering the time series for $t \leq 0$ as a realization of some (unknown) stochastic process. Then the future values for $t>0$ can be presented in the form of an ensemble of possible time series, each with a certain probability (FIG. 8). After averaging the time series over the ensemble, one can represent the forecast in the form shown in FIG. 9, i.e., as the mean value of the predicted data and the probability density distributions.

The methodology of time series forecast is closely related to those of model fitting and identification, as discussed in the Dynamical Invariant Anomaly Detector section above. In general, the non-stationary nature of many sensor data may lead to misleading results for future data prediction if a simple least-square approach to polynomial trend and dominating harmonics is adopted. The correct approach is to apply inverse operators (specifically difference and seasonal difference operators) to the stationary component of the time series and forecast using past values of the time series.

To illustrate this methodology, start with a time series:

$$x = x(t_i), i = 0, 1, \ldots, N \quad (4.4.1)$$

and assume, for demonstration purposes, that its stationarization requires one seasonal differencing:

$$y_t = \nabla_s x_t = x_t - x_{t-s} \quad (4.4.2)$$

$$y = y(t_i), i = 0, 1, \ldots, N-s \quad (4.4.3)$$

and one simple differencing:

$$Z_t = \nabla y_t = y_t - y_{t-1} \quad (4.4.4)$$

$$Z = Z(t_i), i = 0, 1, \ldots, N-s-1. \quad (4.4.5)$$

Based upon the methodology discussed in section 4.2, one can build a model for Eq. (4.4.5) as:

$$Z_t = F(Z_{t-1}, Z_{t-2}, \ldots, Z_{t-m}) + R_{t-1}. \quad (4.4.6)$$

Here F may include a linear component in the form of an auto-regressive process, as well as a nonlinear component, represented by a neural network formalism. $R_{t-1}$ is a sequence of independent random variables characterized by a certain variance, $\sigma^2$, which does not depend upon time; i.e., $R_{t-1}$ is an error of representation of the time series Eq. (4.4.5) by the analytical expression:

$$Z_t = F(Z_{t-1}, Z_{t-2}, \ldots, Z_{t-m}). \quad (4.4.7)$$

A model for the original time series can be easily derived from Eq. (4.4.6) based upon Eqs. Eq. (4.4.4) and Eq. (4.4.2). Eq. (4.4.3) becomes:

$$y_t = y_{t-1} + F([y_{t-1} - y_{t-2}], [y_{t-2} - y_{t-3}], \ldots, [y_{t-m} - y_{t-m-1}]) + R_{t-1} \quad (4.48)$$

and Eq. (4.4.1) becomes $$x_t = x_{t-1} - x_{t-s-1} + F([x_{t-1} - x_{t-s-1} - x_{t-2} + x_{t-s-2}, \ldots, [x_{t-m} - x_{t-s-m} - x_{t-m-1} + x_{t-s-m-1}]) + R_{t-1}. \quad (4.4.9)$$

Thus, it follows from Eq. (4.4.9) that each new value of the time series can be predicted if the past (m+s+1) values are known. Hence, if $$N \geq m + s + 1 \quad (4.4.10)$$

all the necessary values of the variable x are available.

However, in order to predict all the future values by means of successive iterations of Eq. (4.4.9), one has to find the next values of the last term, $R_t$, $R_{t+1}$, etc. Formally this is not possible since, as follows from Eq. (4.4.7), $$R_t = Z_t - F(Z_t, Z_1, \ldots, Z_{t-m+1}) \quad (4.4.11)$$

and these values depend on the values, $x_t$, $x_{t+1}$, etc., which have not yet been measured. This is why the deterministic forecast of future data cannot be achieved in general. Turning to the probabilistic approach, recall that the time series $R_t$ are represented by a sequence of an independent random variable, whose probability density does not depend upon time, since the time dependence of the statistical properties of $R_t$ was eliminated in the course of stationarization (Eqs. Eq. (4.4.2) and Eq. (4.4.4)) while all the correlated components were captured by the mathematical model in Eq. (4.4.9). Hence, the only statistical invariants of $R_t$ are the invariants of its probability density, i.e., the mean, the variance, and the higher moments. This means that all the values, $R_t$, $R_{t+1}$, etc., can be drawn randomly from the time series, $$R_0, R_1, R_2, \ldots, R_{t-1} \quad (4.4.12)$$

Obviously, each sample $$R_t^{(i)}, R_{t+1}^{(i)}, \ldots, etc, \; i=1,2,\ldots,P \quad (4.4.13)$$

will lead to different predicted values for $$x_t^{(i)}, x_{t+1}^{(i)}, \ldots, etc., \; i=1,2,\ldots,P \quad (4.4.14)$$

However, since all of the samples in Eq. (4.4.13) are statistically identical, all the predicted values will represent different realizations of the same stochastic process forming an ensemble.

For each $x_t$ one can find the probability distribution function:

$$f(x_t^{(i)}) = P(X = x_t^{(i)}) \quad (4.4.15)$$

by plotting a histogram for the function:

$$x_t^{(1)}, x_t^{(2)}, \ldots, x_t^{(P)} \quad (4.4.16)$$

Since the original time series Eq. (4.4.1) is non-stationary, the probability functions Eq. (4.4.15) will depend upon time (illustrated in FIG. 7B). Therefore, for each $x_t$ one can compute the statistical invariants such as the mean, $$\mu_t = \sum_{i=1}^{P} x_t^{(i)} f_i(x_t^{(i)}) \quad (4.4.17)$$

the standard deviation $\sigma$, $$\sigma_t = \left[ \sum_{i=1}^{P} (x_t^{(i)} - \mu)^2 f_i(x_t^{(i)}) \right]^{1/2} \quad (4.4.18)$$

as well as higher moments:

$$M_t^q = \sum_{i=1}^{P} (x_t^{(i)} - \mu)^q f_i(x_t^{(i)}) \quad (4.4.19)$$

Similarly, if one wants to forecast the time, $t_f$, when the values of the time series will reach a particular value $x_f$, Eq. (4.4.9) can be evaluated many times for which $t_f = t_{x=x_f}$ is realized to generate a list of $t_f$:

$$t_f^{(1)}, t_f^{(2)}, \ldots, t_{f1}^{(P)} \quad (4.4.20)$$

from which a probability distribution function, $$f(t_f^{(i)}) = P(X = t_f^{(i)}) \quad (4.4.21)$$

can be created to determine the confidence interval or the likelihood of reaching $t_f$ at certain time, t.

4.4.2 Implementation Architecture

The implementation architecture for the Channel Prognosis module is shown in FIG. 10 below. The Predictor 1002 is fed stationary data, the auto regressive model coefficients, past raw data values, and limit values, i.e., everything required to evaluate Eq. (4.4.9) plus a redline value at which to stop the computation. The predictor will generate many predictions of when the channel value will reach the redline limit value and pass them on to the Redline Confidence Estimator 1004. The Redline Confidence Estimator will then construct a probability distribution of the time when the channel value will exceed the redline limit. Finally, the Failure Likelihood Estimator 1006 takes the probability distribution for $t_f$ and computes the likelihood (probability) that the channel value may exceed the redline value within some critical time $t_{critical}$. If the probability exceeds a certain threshold, e.g., 99% confidence, then the critical time and its probability will be sent to the Causal System Model 216, which is discussed in section 4.5.

Implementation of the prognostic assessment component 214 is relatively easy provided guidelines exist about the allowed performance of each parameter. The model coefficients are automatically sensed from data, leaving only the selection of a threshold—usually determined by control functions—to be determined.

4.5 Symbolic Components

The present invention is a system comprising a collection interrelated components configured to operate in accordance with numeric and symbolic algorithms with their combined result being a deep understanding of the current and predicted health of a system. The invention uses a collection of novel numeric and symbolic approaches to synergistically perform real-time diagnosis and prognosis. These components in combination have the capability to fuse and simultaneously analyze all system observables and automatically abstract system physics and information invariants.

One of the biggest weaknesses of a purely symbolic approach is that they only detect and diagnose predicted problems while missing all unmodeled events or incorrectly identifying an unmodeled event as a modeled one. The numeric algorithms of the present invention are used primarily to detect unmodeled events whereas the symbolic algorithms are used to predict expected behavior, correlate it to the unmodeled events and interpret the results. Combining these two methodologies makes it possible to correctly detect and diagnose modeled and unmodeled events in real-time.

The combination of the two approaches provides an ultra-sensitive capability to find degradation and changes in a system and isolate those changes in both space and time and relate the failure to the physical system being modeled with near zero false alarms.

This section focuses on the symbolic components of the system that model expected behavior and diagnose predicted faults and fuse the numeric engine results to form an overall conclusion to the health or future health of the system. The symbolic components consist of the following:

1. Symbolic Data Model
2. Predictive Comparison
3. Causal System Model
4. Interpretation Layer Each of these will be studied individually.

4.5.1 Method of Approach

Our approach uses multiple knowledge representations for providing an automated capability to predict the current system state; detect failures; combine the former items with detected unmodeled events from the numeric engine; and interpret the final results and relate it back to the original models.

Figure 11:
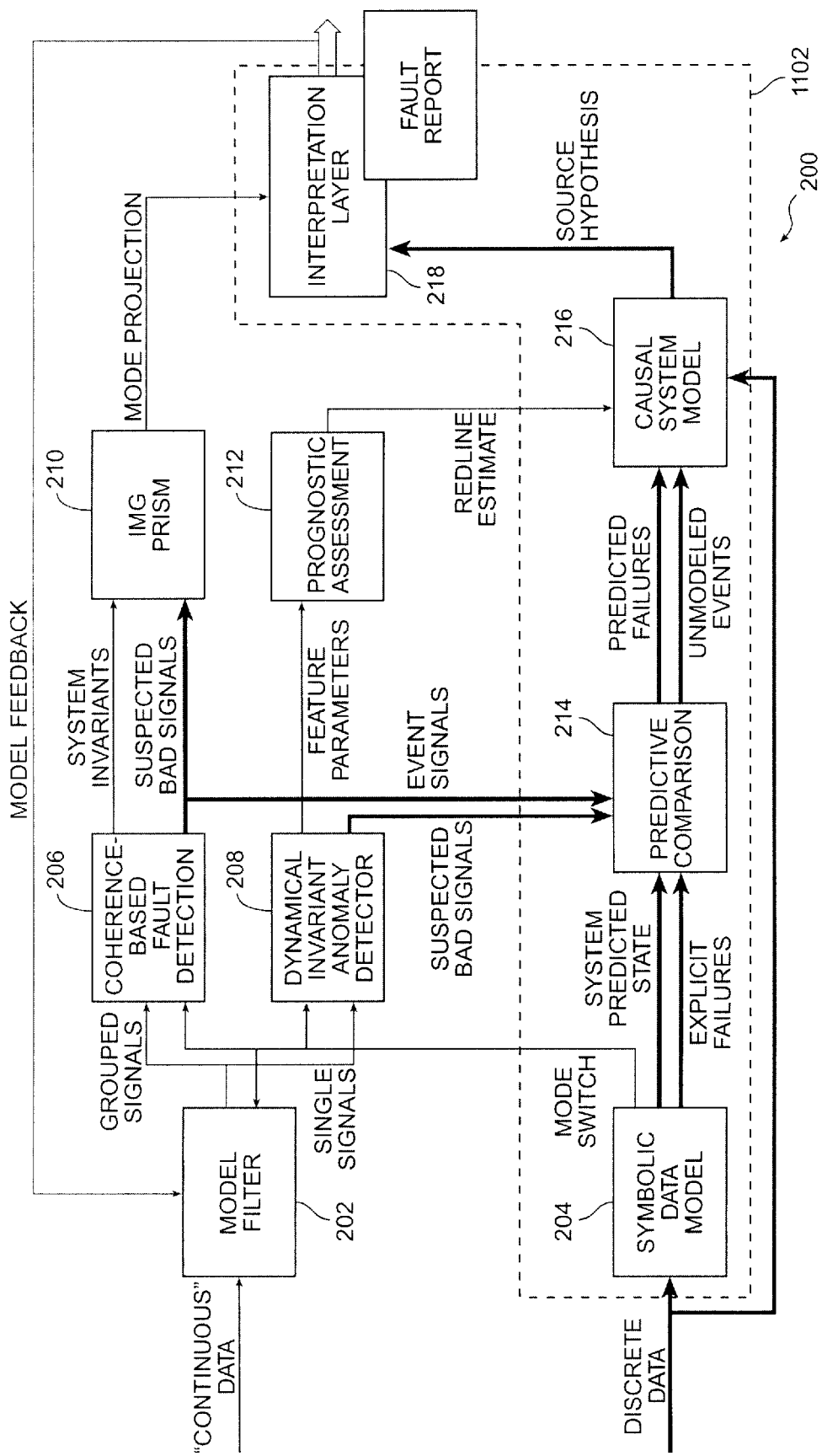
FIG. 11 highlights the symbolic components of FIG. 2.

The technical approach is to monitor all real-time data and actual operational stresses imposed upon a system (real-time data), model expected behavior and performance (engineering models), model causal interrelationships between predicted failures and unmodeled events (causal system model), detect anomalies (real-time data and inference) and translate a series of source hypotheses to one or more combined and focused hypotheses (see FIG. 11).

Real-time measurements are combined with predicted and expected behavior along with predicted performance to quickly isolate candidate faults. The causal system model is then used to perform a deeper analysis to analyze the problem in detail and eliminate incorrect hypotheses. Elimination of incorrect hypotheses helps to eliminate incorrect conclusions caused by incomplete knowledge. This information is stored and automatically reused to constantly refine the inference strategies to avoid dead-end paths.

4.5.2 Present Practice

Traditional practice for automatic fault detection and recovery has been a combination of detecting alarm conditions, derived from elaborate and cumbersome fault trees, and a priori predictions of expected failures based upon engineering models or fault estimates. This is a systematic and definitive way of understanding health management, which is inefficient.

The problem with this methodology is that it is designed to always assume the worst case in system reliability because maintenance is based upon hours-in-use assumptions and unanticipated failures rather than operational stresses. This is like replacing the engine of a car when it reaches 200,000 miles because that is its anticipated lifespan. In reality, the lifespan of the engine depends upon the environment, how the car was driven, its service record, etc.

A more serious problem with this approach has to do with predicted diagnostic space coverage. It has been shown that only twenty to thirty percent of faults can be predicted in advance. This leaves the diagnostic system blind to at least seventy percent of the problems that could actually occur in an operational system.

The more accurate and cost effective approach is to predict failures based upon a combination of physics models, numeric analysis, and symbolic analysis techniques, including a symbolic data model of the predicted behavior of the system. This would include all explicit failures and predicted states. This information is combined with unmodeled events through relationships between what is known or could be related to explicit failures with respect to the current state. This provides an efficient transition in the diagnostic paradigm from assumed failures versus which parts must be replaced. The net effect of this approach is to provide all traditional automatic health monitoring capabilities, as well as the ability to track minute system changes over time, and to detect and predict unmodeled system failures.

The present practice to diagnose and prognose systems is to anticipate all one-point and two-point failure modes. Elaborate checklists are constructed which, it is hoped, will serve to identify all of these failure models and recommend their corresponding maintenance actions.

The inherent problem is that as the complexity of the system increases, the resources required to anticipate failure modes and construct exhaustive checklists becomes exponentially expensive. Furthermore, for diagnostic and prognostic analysis, checklist actions seldom embody the rationale for the procedures that are being followed. This can make it tedious and difficult for humans who are performing the maintenance to focus on the immediate problem at hand.

These techniques are often insufficient in many monitoring, diagnostic or maintenance applications. Control and diagnostic mechanisms in these approaches cannot be dynamically matched to the exigencies of the situation. They are typically inflexible and cannot easily accommodate the reconfiguration or modification of the system under test. Such systems are usually unresponsive to the varying degrees of skill of the different technicians who use them. Poor real-time performance is also symptomatic of conventional automation approaches to diagnosis and maintenance.

Furthermore, as a maintenance prediction or diagnostic tool, checklists seldom embody the rationale for the procedures that are being followed. This can make it tedious and difficult for humans who are performing checklist actions to focus on the immediate problem at hand.

An important consideration in a real-time system is quick responses to system failures and maintenance predictions may be critical. The ability of human operators and maintenance personnel to compensate for a failure, determine a diagnosis with incomplete or partial information and quickly institute a recovery or maintenance procedure diminishes as system complexity increases. These considerations make the ability for long-term wear detection combined with maintenance recommendations very desirable and an excellent candidate for automation.

4.5.3 Technical Overview

Traditional expert systems for diagnosis utilize only a single kind of knowledge representation and one inference mechanism. Our approach uses real-time measurements along with predicted and expected behavior, past performance, and unmodeled event detection to quickly isolate candidate faults. Combining these methodologies makes it possible to correctly detect and diagnose modeled and unmodeled events in real-time. The technical approach is as follows:

1. Monitor all real-time data and actual operational stresses imposed upon a system (real-time data).
2. Model expected behavior and performance (engineering models)
3. Causal interrelationships between from predicted failures and unmodeled events (Causal system model)
4. Detect anomalies (real-time data and inference)
5. Translate a series of source hypotheses to one or more combined and focused hypotheses.

The causal system model 216 is used to perform a deeper analysis, using rules supplied by engineers, to eliminate incorrect hypotheses. This information is stored and automatically reused to constantly refine the inference strategies to avoid dead-end paths.

Using the symbolic components for diagnosis and modeling and BEAM for detection and prognostics, it provides a complete and unified diagnostic and prognostic system to diagnose prognose and interpret modeled and unmodeled events. This makes multiple tools unnecessary for the detection, diagnosis, prognosis and modeling functions. In this manner interfacing and representation of information is much easier and provides a single, clean and concise solution.

Let us examine the particular components in detail individually.

Symbolic Data Model

Figure 12:
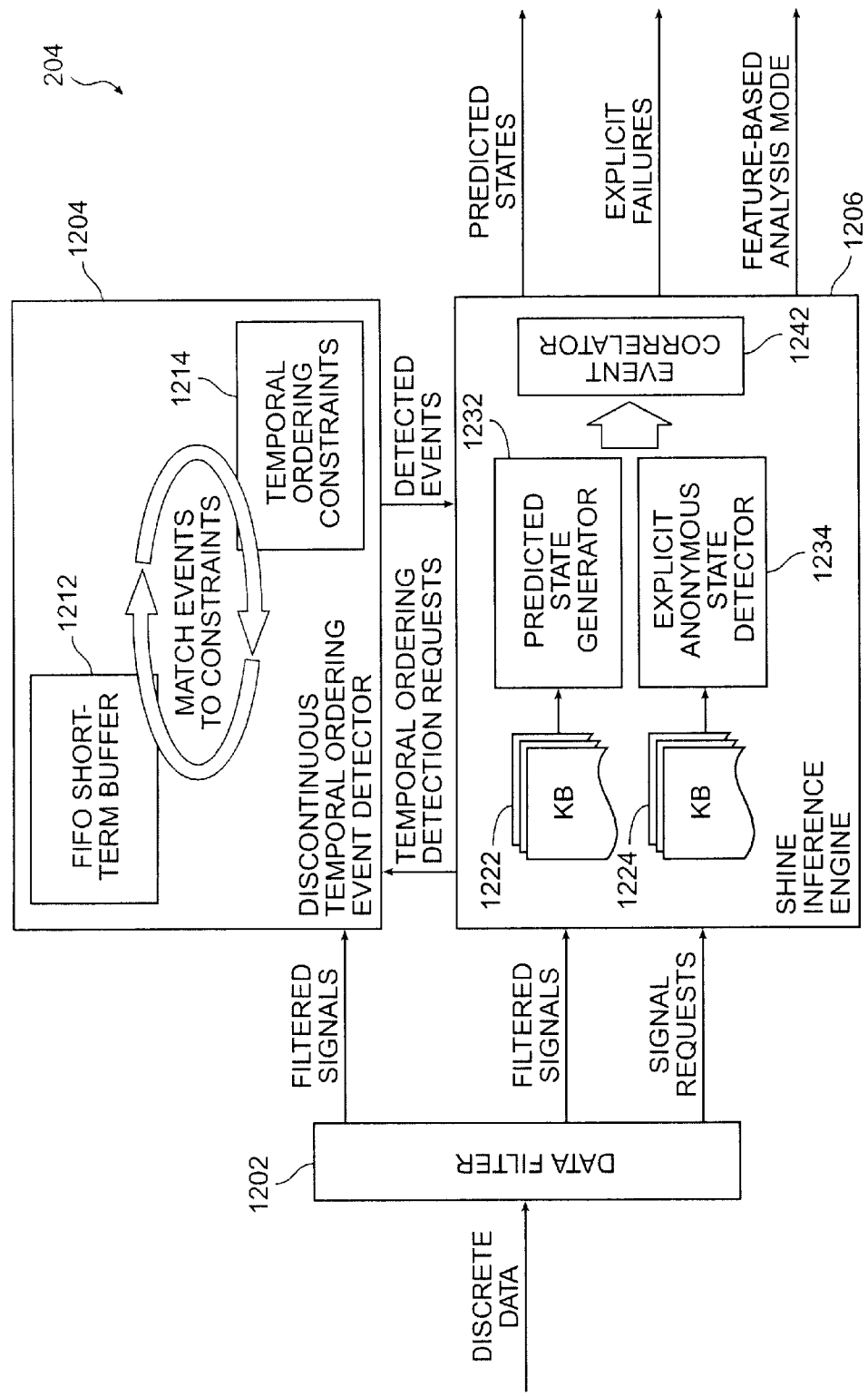
FIG. 12 is a high level block diagram illustrating an example of an embodiment of the symbolic data model module of FIG. 2.

The Symbolic Data Model (SDM) 204, illustrated in FIG. 12 above, is the first line of defense in determining the overall health of the system and it is the primary component that determines the system's active states and predicted states. It operates by examining the values from status variables and commands to provide an accurate, evolving picture of system mode and requested actions. Since most rule-based diagnostic systems (expert systems) provide only this module and nothing else, they are limited in that they can only identify and diagnose anticipated problems.

Knowledge in the SDM is represented as rules, which are composed of patterns. The rule is the first Aristotelian syllogism in the form: If . . . Then . . . . The variables of the syllogism are joined by the And/Or logical connections. The selector Else points to other cases. This formula is a rule; the rules are sequenced in the succession of logical thinking or pointed at a jump in the sequence (Else→Go To).

If Pattern

Then Action

Patterns are relations that may or may not have temporal constraints, i.e., may only hold true at certain times or persist for the entire duration of the analysis. Patterns define the constraints that must hold true in order for the antecedent to succeed. Some examples of relations are:

SNR<60 and SNT>0.68

SNR<20 While State="Idle"

Remaining_Distance*MPG<=Remaining_Fuel

Conceptual representation is the main way for putting the patterns of the system into a computer program. The task of concatenation of pattern situations, preparation of the ways of reasoning, inference is the procedural representation of the meta patterns. The essential tool the SDM uses is a rule; that is the reason why another name for expert systems is rule-based system.

The SDM operates by using many small slivers of knowledge organized into conditional If-Then rules. These rules are then operated on in a variety of different ways to perform different reasoning functions.

Relational representation of traditional logic is occluded by the Closed World Assumption, which includes only a limited number of concepts and relations, and supports the hypothesis that the entire problem domain is explorable in a well-defined way. Uncertainty methods open some windows to the real world of unexplored, unexpected phenomena. This is especially true for the non-traditional uncertainty methods that ignore the hypothesis of excluded middle and of independence of basic events. The price of a more permissive method is the increased softness of their basic model and consequently the inefficiency of reasoning capability. From the point of view of logical and mathematical rigor, they are less and less welcome.

To avoid these obvious pitfalls the SDM uses modal operators. Modal operators grew out of the modalities of classical logic, i.e. the limitations of the validity to certain subjects and interpretation of fields. We accomplish this by providing a rich set of quantifiers for the patterns. The following modal operators are provided:

| | |
|---|---|
| 1. It is necessarily true that x | Alethic logic |
| 2. It is possibly true that x | Alethic logic |
| 3. It will always be true that x | Temporal logic |
| 4. It will be sometimes that x | Temporal logic |
| 5. It ought to be that x | Deontic logic |
| 6. It can be that x | Deontic logic |
| 7. It is known that x | Logics of knowledge |
| 8. The opposite of x is not known | Logics of knowledge |
| 9. It is believe that that x | Logics of belief |
| 10. The opposite of x is not believed | Logic of belief |

Because the numeric models take a certain amount of time to ascertain the current health of the system, the SDM is the primary defense in diagnosing its instantaneous health. Its primary input is the discrete data stream comprising the system status variables and system command information. This stream contains all the data channels that are necessary for the SDM to make an analysis.

Unlike the numeric models, the SDM requires a knowledge base in order to perform its analysis functions. From several points of view, representation of knowledge is the key problem of expert systems and of artificial intelligence in general. It is not by chance that one of the favorite namings of these products is knowledge-based systems.

The generic features of knowledge are embodied in representation. The domain expert stores the objects, actions, concepts, situations and their relations using the SHINE representation language (see SHINE description) and this is stored in the SDM knowledge base. The collection of this knowledge represents the sum total of what the SDM will be able to understand. The SDM can only be as good as the domain expert that taught it.

At the front end of the SDM is a Discrete Filter 1202. The purpose of the filter is to act as a rate governor to limit the amount of data being sent to the SDM at any given moment. Unlike the numeric models which have to analyze a broad spectrum of data to look for their correlations, the SDM, being a knowledge-based system knows at any given moment all the information that it will require to make its analysis. The SDM adjusts the discrete data filter so that the information content is maximized and superfluous data is eliminated.

One of the common problems with monitoring real-time data streams is that the data often does not arrive in a consistent order. We have often found that related data from one source arrives long after its partnering data from another source. For example, you can be monitoring data from two different instruments. Each of these instruments can be producing their results at different data rates or, even worse, be delayed by some special processing. In a traditional expert system this would wreak havoc because they operate on data that is aligned on data frame boundaries. When data is skewed across multiple frames, then the expert system loses the operational context and gets confused because of conflicting contradictory data arriving.

We eliminate this shortcoming by introducing a Discontinuous Temporal Ordering Event Detector (DTED) 1204. The DTED automatically derives temporal relationships from the knowledge base to allow data to arrive across multiple frame boundaries, i.e., their time tags do not exactly match. This allows the SDM to delay its conclusions until all the data arrives and if the arrival of the skewed data would cause a change in its diagnosis, then those conclusions would be retracted before a false alarm or incorrect derived state is asserted.

The SDM generates two primary kinds of results: derived states and discrepancies. To provide a uniform representation, we use the identical approach in performing each of these functions and they differ only in their knowledge bases that they use.

Since two knowledge bases are being used, it is possible to generate erroneous results when instantaneous state changes occur and generate spikes in the data streams. To further eliminate false alarms we include an Event Correlator (EC) that matches the anomalies with state changes to filter out transient events that are not sustained across multiple frames. This provides for an even greater amount of insurance than when an anomaly is generated that it is in fact a real event and not transient phenomena.

Predictive Comparison

Figure 13:
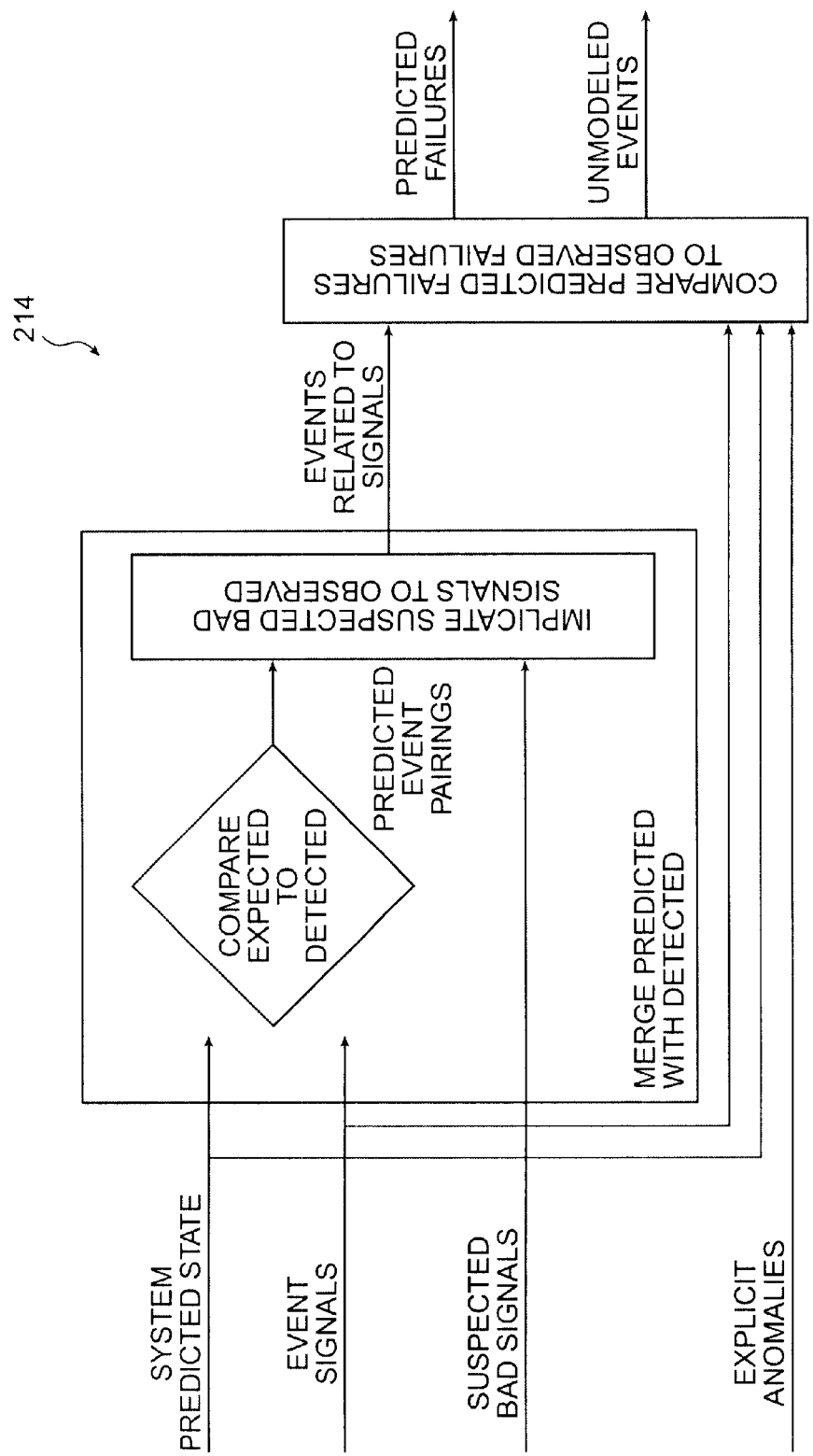
FIG. 13 is a high level block diagram illustrating an example of an embodiment of the predictive comparison module of FIG. 2.

The Predictive Comparison (PC) component 214 shown in FIG. 13 compares the requested and commanded operation of the system versus the sensed operation as interpreted from the time-varying quantities. Its goal is to detect misalignment between system software execution and system hardware operation.

The PC combines the results from the numeric and symbolic engines and looks for confirmation and differences between them. It is the primary interface that merges the symbolic results for the system predicted state and explicit failures with the suspected bad channels from the dynamical invariant anomaly detector with the event signals from coherence-based fault detection algorithms.

Its result is a sequence of confirmed predicted failures and detected unmodeled events. A failure is considered confirmed when both the numeric and symbolic engines each predict the same failure or system state change. Unmodeled events are those cases where the numeric and symbolic engines differ in their conclusions. The capability of having parallel analysis engines running, each approaching the problem from an entirely different theoretical foundation, makes our system different and more powerful than the others.

This module uses generic symbolic processing algorithms and does not require a knowledge base in order to perform its function. The following kinds of comparisons are made:

1. Examines the system predicted state from the symbolic engine and correlates them to detected events from the numeric engine. If the numeric engine generates an event and it approximately correlates with a predicted state change, then the predicted state is considered confirmed.
2. Examines the signals that are diagnosed as bad from the symbolic engine and correlates them with the suspected bad signals from the numeric engine and when there is agreement, then the channel is confirmed as bad. When there is a difference between the two, the signal is marked as an unmodeled event.

The final component in the PC is to merge results from items 1 and 2 with the list of explicit failures and events so multiple redundant conclusions of bad signals and unmodeled events are not generated.

Causal System Model

Causal System Model

Inputs

Figure 14:
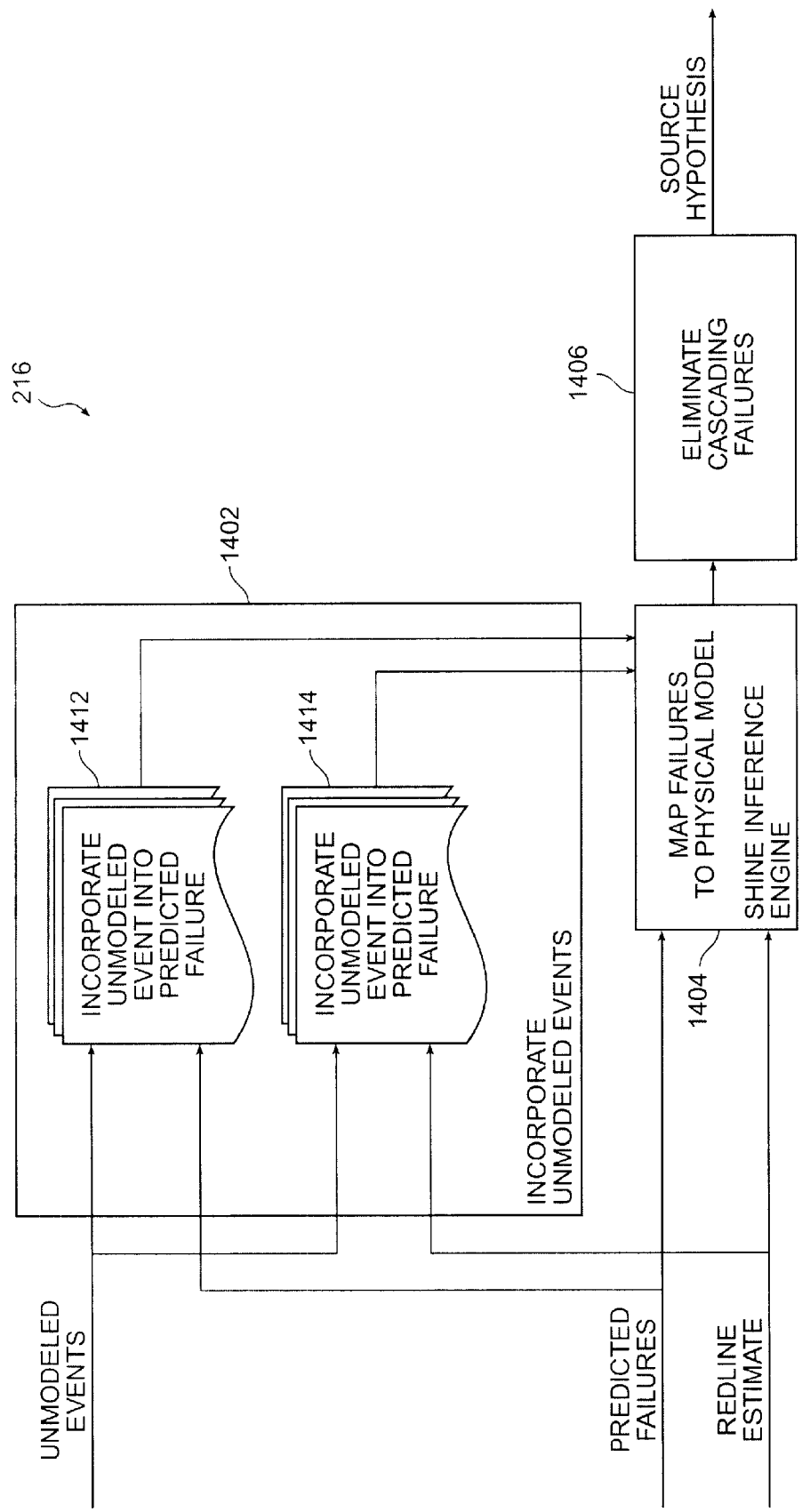
FIG. 14 is a high level block diagram illustrating an example of an embodiment of the causal system model module of FIG. 2.

Predicted failures from predictive comparison
Unmodeled events from predictive comparison
Redline estimates from prognostic assessment
Discrete data Outputs Source Hypothesis The Causal System Model (CSM) shown in FIG. 14 is a connectivity matrix designed to improve source fault isolation and actor signal identification. In the SDM, the entire domain knowledge is represented as If-Then rules only. When the domain is very large and complex, an entirely rule-based representation and associated inference leads to a large and inefficient knowledge base causing very poor focus of attention. To eliminate such unwieldy knowledge bases in the SDM engine 204, we provide a causal system model. This allows the same problem to be simplified in the SDM by providing a component that automatically looks for relationships between observations in the data to fill in the blanks or gaps that are not explicitly provided from the SDM.

The purpose of the Causal System Model (CSM) is to relate anomalous sensor readings to a functional unit of the system. If the anomaly corresponds to a known fault mode and/or shows up only in discrete data, we are confident which part of the system is functioning incorrectly. The more complex case is for novel, unmodeled events. Given the "unmodeled event" data, the goal is to identify which signals contribute to the event. The sensor signals are combined with faults that we know about, giving us a large collection of signals all taking part in the anomaly. Each signal originates somewhere in the system, so we have implicated a large number of components as potentially failed. But most of these are secondary effects. We need to find the root cause.

This is accomplished by decomposing the problem into smaller modules called knowledge sources and by providing a dynamic and flexible knowledge application strategy. The same concept can be extended to problems requiring involvement of multiple agents representing different domains.

The CSM reacts as and when conflicts arise during problem solving and uses conflict-resolution knowledge sources in an opportunistic manner. Essentially, the CSM provides a high-level abstraction of knowledge and solution and the derived relationships between observation and implication.

The three basic components of the CSM are the knowledge sources, blackboard data structure and control. In the CSM, knowledge required to solve the problem is decomposed into smaller independent knowledge sources. The knowledge sources are represented as SHINE If-Then rules. Each rule set or knowledge source contains knowledge for resolving one task in the diagnostic model. The blackboard holds the global data and the information on the problem-solving states. Activation of the knowledge sources modifies the states in the blackboard leading to an incremental causal relationship for actor signal identification.

Since the causal relationship is decomposed into a hierarchical organization, the concept of an event becomes predominant in this blackboard-centered strategy. Any change in the blackboard is considered an event. Any change in the solution state either due to generation of additional information or modification of existing information is immediately recorded. The execution controller notes this change and takes the necessary actions by invoking an appropriate knowledge source. This process repeats until the final causal relationship is obtained.

Since the CSM is feed with a real-time stream of events (anomalies, suspected bad signals, events and unmodeled events), the arrival of a new event can make a previous concluded causal relationship incorrect. In such cases, corresponding stages have to be undone by backtracking all the previously made assumptions leading to the reasoning to be non-monotonic. This requires a dependency network to be incrementally maintained as the causal assumptions are generated using the knowledge sources.

FIG. 14 shows a block diagram of an illustrative embodiment of this aspect of the invention. The processing block 1402 bundles the conclusions from the symbolic and numeric components to create the complete list of affected signals. The block comprises two knowledge sources 1412 and 1414. This can be done for diagnosis (the Predicted Failures path) or for prognosis (the Redline Estimate path). In the former, we are including signals that demonstrate explicit failures. In the latter, we include signals that are expected to cross redlines soon, as reported by the Prognostic Assessment module. The SHINE inference engine 1404 relates the signals to functional blocks in the system. The cascading failures block 1406 backsolves through the system block representation to contrive a minimum hypothesis.

Interpretation Layer

Figure 15:
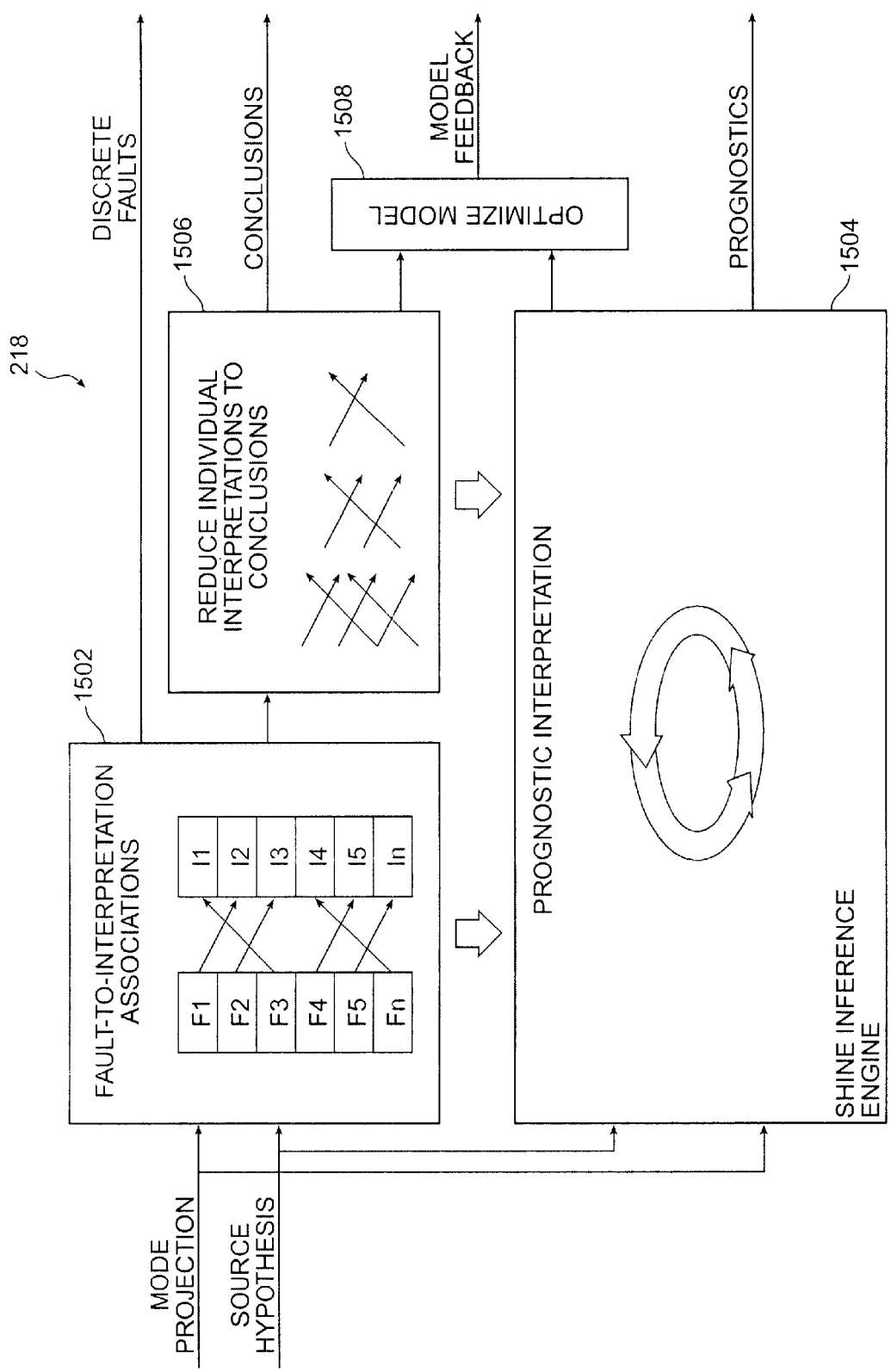
FIG. 15 is a high level block diagram illustrating an example of an embodiment of the interpretation module of FIG. 2.

The Interpretation Layer (IL) 218 of FIG. 15 collates observations from separate components and submits a single fault report in a format usable to recovery and planning components or to system operators. This is a knowledge-based component that is totally dependent upon the domain and the desired format of the output.

As its inputs it accepts a list of events from the CSM and possible conclusions from the SDM as described above. Any supported conclusion that the SDM generates is considered a final output and is translated into the required output format.

The CSM events can be decomposed into rule-based anomalies and detected events from the numeric engine. The interpretation layer performs a many-to-many mapping of faults (events) to interpretations. Each interpretation has a context associated with it. Because of this context, when multiple interpretations are generated within the same context, they can be grouped together as one interpretation containing several elements. This is typical of events in complex systems in general.

Contexts are assigned by a contextual engine within the interpretation layer. Its purpose is to look for commonalities among each unique interpretation. In this manner if there is either a causal or interdependent relationship between interpretations, they are considered as possibly related. For example, if we have an alarm condition occurring on signals monitoring volts and/or amps, and the SDM concluded a fault based upon the number of watts generated, the engine will combine the volts and amps alarms with the watts conclusion. This provides for a very concise statement of the fault at hand without the user being deluged with disjointed information from many different sensors.

The final reduced set of interpretations is processed by a component that reduces interpretations to conclusions. A rule-based model is used to apply relationship definitions between interpretations, their causal relationships and their supported conclusion. For example, if the SDM did not generate a conclusion for watts being in alarm based upon the signals of volts and amps being overranged, then such a conclusion can be made here and generated as a final output.

4.5.4 Implementation

Detecting modeled and unmodeled events and system prognostics using real-time inputs makes use of multiple types of knowledge such as detection, diagnostic, simulation and causal modeling. To combine these different approaches heuristic, experiential knowledge is used to quickly isolate candidate faults and then use deeper causal model-based reasoning to analyze the problem in detail and eliminate incorrect hypotheses.

The Symbolic Data Model is a knowledge-based system that provides a control structure that can easily switch between different types of knowledge and reasoning strategies. In addition, it provides multiple knowledge representations suited to each type of knowledge employed and provides mechanisms to move easily from one representation to the next during problem solving.

Part of our system uses an approach based upon DRAPhys (Diagnostic Reasoning About Physical Systems) developed at NASA Langley Research Center. One advancement over the DRAPhys system is that we include knowledge-based modules for specific strategies of diagnostic reasoning that do not need tight coupling. This makes construction of the expert system much easier because software and domain knowledge can be reused for models of different hardware. Like DRAPhys system, we include a knowledge-based model that preprocesses the qualitative interpretation of sensor data prior to analysis.

The input is quantitative sensor data from either a real-time data source or archived data. This can take the form of a real-time data stream, or a "beacon" approach using only significant events.

The fault monitor compares the sensor data with the output of the quantitative model that simulates the normally functioning physical system. The monitor signals a fault when the expected system state derived from the system model differs from the actual system state. The expected behavior is a combination of engineering predictions from the Gray Box physical model representation and real-time sensor values.

When a fault is detected, the monitor provides the diagnostic process with a set of the abnormal sensor values in qualitative form, e.g., the symbol signal to noise ratio is exceeding predictions with respect to current ground system configuration, along with time tags to show the temporal ordering of symptoms.

The diagnostic process is divided into several discrete stages and each stage has a unique diagnosis strategy. Each of these stages and their relationships to one another are described below.

Stage 1: Diagnosis by Fault-Symptom Association

The first stage utilizes heuristic, experiential knowledge generated from the expertise of engineers to compare fault symptoms with known fault types and failure modes. The most commonly occurring faults are diagnosed in this stage. However, the first stage will be unable to identify the cause of failures or predicted failures that are unusual or difficult to determine from the qualitative sensor information provided.

Stage 2: Model-Based Diagnosis

The second stage of the diagnostic process is a knowledge-based system that is based on a functional model of the underlying system.

The purpose of this stage is to localize a fault by devising hypotheses based on how the effects of the fault would propagate through the subsystem. When this stage fails to identify a unique failure or maintenance prediction, then the third stage of diagnosis is entered.

Stage 3: Numeric Analysis

In this stage the system uses sensor data, results from software, and commands which are simultaneously fused in real-time to automatically abstract system physics and information invariants (constants). This makes the system ultra-sensitive to system degradation and change so that shifts can be isolated in time and space to specific sensors. The numeric analysis modules predict faults prior to loss of functionality.

Stage 4: Interpretation Layer

The numeric components excel at flagging individual or combined sensors that show abnormal values, but it does not relate the sensors to actual physical systems. The interpretation layer combines the numeric results with the symbolic results to form an integrated conclusion about the failure or set of failures in the system.

When a unique diagnosis cannot be identified, the system will provide information about potentially failed functions in order to aid more efficient diagnosis or repair of the problem.

4.5.5 Technical Perspective

Our system is specifically designed for real-time fault detection and prognostics of modeled and unmodeled anomalies. It differs substantially from other systems that only identify the fault. The objective is to not only identify the fault from multiple stages of analysis, but to determine the effects that the failure will have on the functionality of the subsystem as a whole, and what remedial actions are most appropriate to correct the deficiency. Multiple levels of abstracted diagnostic capability applied to all affected subsystems provides the ability to determine the overall effect of faults on system performance.

Real-time performance affects the information available for diagnosis and the particular reasoning strategies that may be employed. One consideration is that a physical system's behavior may change as time progresses while performing fault diagnosis. During diagnosis, failure effects may propagate to other functionally or physically connected subsystems. This dynamically changes the failure symptoms with which the diagnosis system must reason. We intend to make use of this dynamically changing information about the system to identify the specific physical cause(s) of a failure, the fault type, responsibility and affected system components and the fault propagation history.

Each stage of the diagnostic process utilizes the sequence of changing fault symptoms to focus the reasoning process and eliminate fault hypotheses. The first stage includes a rule-based system that includes temporal reasoning functions. This helps capture knowledge about changing symptoms associated with specific failures. For example, when we have excessive phase noise in a receiver, then the system will observe the symptoms as, "The receiver goes in and out of lock . . . ". Using dynamic information early in the diagnostic process helps to distinguish among faults that may have the same initial symptoms but diverge in subsequent behavior. For example, it could be an unexpected transient weather condition or a slowly degrading receiver or a drifting antenna error.

The functional and physical models used by the second stage can be thought of as a constraint-based dependency network. A functional interaction or physical adjacency between two subsystems is represented as a dependency association in the network.

The diagnostic process in stage two attempts to map failure symptoms to specific components in the models and then determine the additional affected components by tracing through the network. The time-order of symptoms benefits this process by suggesting or confirming a sequence of components affected by the failure.

The first component in a functionally connected sequence of components exhibiting failure symptoms is deduced to be the component responsible for the failure. A model of physical adjacency is used to resolve ambiguity, such as when a fault propagates physically between subsystems that are not functionally connected.

The interpretation layer combines the results from the numeric and symbolic engines and maps them to the physical model for easy identification. It also takes collections of interrelated failures, e.g., a cascading chain of failures originating from a single point, and relates it to the single failing point rather than all the symptoms.

What is claimed is:

1. A method for diagnosis and prognosis of faults in a physical system comprising:

providing sensor data representative of measurements made on the physical system, the measurements being representative of values of signals produced by the physical system;

producing model enhanced sensor signals by fitting the sensor data to at least a partial physical model of the physical system;

identifying correlated signals from among the sensor data;

comparing the correlated signals with expected correlated signals to detect one or more occurrences of events, the expected correlated signals representative of known operating conditions of the physical system;

providing discrete data representative of system status variables and system command information;

detecting discrepancies among the discrete data;

identifying the one or more occurrences of events as unmodeled events based at least on the model enhanced sensor signals; and verifying faults based on the discrepancies among the discrete data.

2. The method of claim 1 wherein the correlated signals are based on a coherence coefficient, $\zeta_{ij}$, defined by:

$$\zeta_{ij} = \frac{|\text{Cov}(S_i, S_j)|}{\text{Max}(\text{Var}(S_i), \text{Var}(S_j))},$$

where $S_i$ and $S_j$ are the signals produced by the physical system, $$\text{Cov}(S_i, S_j) = \frac{1}{t} \int (S_i - \overline{S}_i)(S_j - \overline{S}_j) dt, \text{ and}$$

$$\text{Var}(S_i) = \frac{1}{t} \int (S_i - \overline{S}_i)^2 dt.$$

3. The method of claim 1 further including performing a training sequence to produce the expected correlated signals.

4. The method of claim 1 further including identifying suspect bad signals by detecting discrepancies among the sensor data based on a statistical model of the sensor data, wherein the step of identifying the unmodeled events is based on the suspect bad signals in addition to the model enhanced sensor data.

5. The method of claim 4 further including identifying statistical components of the sensor data, wherein the statistical model is based only on the statistical components of the sensor data.

6. A system health monitor for diagnosis and prognosis of faults in a physical system being monitored comprising:

a model filter having at least a partial model representation of the physical system, the model filter operable to produce a plurality of model enhanced signals based on sensor data, the sensor data representative of measurements made on the physical system;

a symbolic data model operable to produce predicted system states based on discrete data comprising system status variables and system command information, the symbolic data model further operable to detect discrepancies among the discrete data;

a first anomaly detector operable to identify unmodeled events by computing one or more coherence statistics from the sensor data and comparing the coherence statistics against expected coherence quantities indicative of known operating conditions of the physical system;

a predictive comparator module operable to confirm a failure based on detected discrepancies among the discrete data, and to distinguish the unmodeled events from modeled events based at least on the model enhanced signals;

a prognostic assessment module operable to produce predicted faults using a stochastic model of the sensor data to produce future values of the sensor data from the stochastic model; and a presentation module for presenting information relating to the health of the system comprising detected discrepancies, a categorization of modeled and unmodeled events, and predicted faults, the information suitable for a human user or a machine process.

7. The system of claim 6 further including a second anomaly detector operable to detect discrepancies in the sensor data based on a statistical model of the sensor data, the discrepancies in the sensor data being identified as suspect bad signals, the predictive comparator further distinguishing the unmodeled event from the modeled events based on the suspect bad signals.

8. The system of claim 6 further including a filter to identify deterministic components contained in the sensor data and to produce residual data from the sensor data that is absent the deterministic components; and a second anomaly detector operable to detect discrepancies in the sensor data based on a statistical model of the residual data, the discrepancies in the sensor data being identified as suspect bad signals, the predictive comparator further distinguishing the unmodeled event from the modeled events based on the suspect bad signals.

9. The system of claim 6 wherein the coherence statistics are based on a coherence coefficient, $\zeta_{ij}$, defined by:

$$\zeta_{ij} = \frac{|\text{Cov}(S_i, S_j)|}{\text{Max}(\text{Var}(S_i), \text{Var}(S_j))},$$

where $S_i$ and $S_j$ are time-varying signals represented by the sensor data, $$\text{Cov}(S_i, S_j) = \frac{1}{t}\int (S_i - \overline{S}_i)(S_j - \overline{S}_j)dt, \text{ and}$$

$$\text{Var}(S_i) = \frac{1}{t}\int (S_i - \overline{S}_i)^2 dt.$$

10. A computer program product effective operating a computer system for diagnosis and prognosis of faults in a physical system comprising:

computer-readable media; and computer-executable instructions recorded on the computer-readable media comprising:

first executable program code effective to operate the computer system to receive sensor data representative of measurements made on the physical system and to receive discrete data, the measurements representative of values of signals produced by the physical system, the discrete data representative of system status variables and system command information;

second executable program code effective to operate the computer system to produce model enhanced sensor signals by fitting the sensor data to at least a partial physical model of the physical system;

third executable program code effective to operate the computer system to identify correlated signals from among the sensor data;

fourth executable program code effective to operate the computer system to compare the correlated signals with expected correlated signals to detect one or more occurrences of events, the expected correlated signals representative of known operating conditions of the physical system; and fifth executable program code effective to operate the computer system to identify the one or more occurrences of events as unmodeled events based at least on the model enhanced sensor signals, to detect discrepancies among the discrete data, and to verify faults based on the discrepancies among the discrete data.

11. The computer program product of claim 10 further including sixth executable program code effective to operate the computer system to identify suspect bad signals by detecting discrepancies among the sensor data based on a statistical model of the sensor data, wherein the unmodeled events are further based on the suspect bad signals.

12. The computer program product of claim 11 wherein the sixth program code further includes program code for identifying statistical components of the sensor data, wherein the statistical model is based only on the statistical components of the sensor data.

13. The computer program product of claim 10 wherein the correlated signals identified are based on a coherence coefficient, $\zeta_{ij}$, defined by:

$$\zeta_{ij} = \frac{|\text{Cov}(S_i, S_j)|}{\text{Max}(\text{Var}(S_i), \text{Var}(S_j))},$$

where $S_i$ and $S_j$ are the signals produced by the physical system, $$\text{Cov}(S_i, S_j) = \frac{1}{t}\int (S_i - \overline{S}_i)(S_j - \overline{S}_j)dt, \text{ and}$$

$$\text{Var}(S_i) = \frac{1}{t}\int (S_i - \overline{S}_i)^2 dt.$$

14. A system health monitor for detecting anomalies in a physical system being monitored comprising:

a model filter having at least a partial model representation of the physical system, the model filter operable to produce a plurality of model enhanced signals based on sensor data, the sensor data representative of measurements made on the physical system;

a symbolic data model operable to produce predicted system states based on discrete data comprising system status variables and system command information, the symbolic data model further operable to detect discrepancies among the discrete data;

means for identifying correlated signals from the sensor data;

data store comprising a plurality of expected coherence quantities representative of known operating conditions of the physical system;

means for selecting one or more of the expected coherence quantities based on the predicted system states; and means for identifying an unmodeled event by comparing the correlated signals against one or more selected expected coherence quantities, wherein the unmodeled event constitutes a detected anomaly.

15. The system of claim 14 further including training means for producing the expected coherence quantities.

16. The system of claim 14 wherein the correlated signals are identified based on a coherence coefficient, $\zeta_{ij}$, defined by:

$$\zeta_{ij} = \frac{|\text{Cov}(S_i, S_j)|}{\text{Max}(\text{Var}(S_i), \text{Var}(S_j))},$$

where $S_i$ and $S_j$ are time-varying signals represented by the sensor data, $$\text{Cov}(S_i, S_j) = \frac{1}{t}\int (S_i - \overline{S}_i)(S_j - \overline{S}_j)dt, \text{ and}$$

$$\text{Var}(S_i) = \frac{1}{t}\int (S_i - \overline{S}_i)^2 dt.$$

* * * * *